(12) United States Patent
Brogger et al.

(10) Patent No.: US 11,589,703 B1
(45) Date of Patent: Feb. 28, 2023

(54) SPECTRAL SIGNATURE SYSTEMS THAT USE ENCODED IMAGE DATA AND ENCODED SPECTRAL SIGNATURE DATA

(71) Applicant: Microtrace, LLC., Minneapolis, MN (US)

(72) Inventors: Brian John Brogger, Blaine, MN (US); Joseph Thomas Ippoliti, Woodbury, MN (US); Blake Maxwell Roeglin, Minneapolis, MN (US); Brian Thomas Bustrom, Roseville, MN (US)

(73) Assignee: MICROTRACE, LLC., Minneapolis, MN (US)

( * ) Notice: Subject to any disclaimer, the term of this patent is extended or adjusted under 35 U.S.C. 154(b) by 365 days.

(21) Appl. No.: 16/868,926

(22) Filed: May 7, 2020

Related U.S. Application Data

(60) Provisional application No. 62/845,018, filed on May 8, 2019.

(51) Int. Cl.
| | | |
|---|---|---|
| *A47J 31/44* | (2006.01) | |
| *G06K 7/14* | (2006.01) | |
| *G06K 19/06* | (2006.01) | |
| *A47J 31/40* | (2006.01) | |

(52) U.S. Cl.
CPC ......... *A47J 31/4492* (2013.01); *A47J 31/407* (2013.01); *G06K 7/1417* (2013.01); *G06K 19/0614* (2013.01)

(58) Field of Classification Search
CPC .. A47J 31/4492; A47J 31/407; G06K 7/1417; G06K 19/0614
See application file for complete search history.

(56) References Cited

U.S. PATENT DOCUMENTS

| | | |
|---|---|---|
| 3,904,642 A | 9/1975 | Mach et al. |
| 4,005,111 A | 1/1977 | Mach et al. |
| 4,089,995 A | 5/1978 | Ferro et al. |
| 5,135,569 A | 8/1992 | Mathias |
| 5,380,695 A | 1/1995 | Chiang et al. |
| 5,674,622 A | 10/1997 | Burns et al. |
| 5,710,197 A | 1/1998 | Fischer et al. |
| 5,913,963 A | 6/1999 | King |
| 6,153,123 A | 11/2000 | Hampden-Smith et al. |
| 6,165,384 A | 12/2000 | Cooper et al. |
| 6,375,864 B1 | 4/2002 | Phillips et al. |
| 6,483,576 B1 | 11/2002 | Gardner |

(Continued)

FOREIGN PATENT DOCUMENTS

| | | |
|---|---|---|
| CA | 2442983 C | 10/2002 |
| CA | 2839293 C | 12/2012 |

(Continued)

*Primary Examiner* — Sonji N Johnson
(74) *Attorney, Agent, or Firm* — Kagan Binder, PLLC

(57) ABSTRACT

The present invention provides improved spectral signature strategies for use in a wide range of product and service applications. The present invention encodes spectral signature features into one or more optical brightener compounds and/or one or more infrared absorbing compounds. Equipment is modified with appropriate ultraviolet/violet or infrared LED illumination sources and corresponding detectors, optionally optical filters, and optionally mask elements, in order to read the spectral responses. These features desirably are used in combination with one or more other luminescent taggant compounds.

19 Claims, 12 Drawing Sheets

(56) References Cited

U.S. PATENT DOCUMENTS

| | | |
|---|---|---|
| 6,492,093 B2 | 12/2002 | Gaschler et al. |
| 6,632,783 B1 | 10/2003 | Giblin et al. |
| 6,676,852 B2 | 1/2004 | Brown et al. |
| 6,813,011 B2 | 11/2004 | Gardner et al. |
| 6,861,012 B2 | 3/2005 | Gardner et al. |
| 7,122,076 B2 | 10/2006 | Vonwiller et al. |
| 7,165,488 B2 | 1/2007 | Bragg et al. |
| 7,497,972 B2 | 3/2009 | Lichtenstein et al. |
| 7,523,695 B2 | 4/2009 | Streeter et al. |
| 7,531,108 B2 | 5/2009 | Hampden-Smith et al. |
| 7,547,894 B2 | 6/2009 | Agrawal et al. |
| 8,034,436 B2 | 10/2011 | Wei |
| 8,080,307 B2 | 12/2011 | Demartin Maeder et al. |
| 8,159,657 B2 | 4/2012 | Degott et al. |
| 8,495,949 B2 | 7/2013 | Tinkler et al. |
| 8,609,170 B2 | 12/2013 | Tinkler et al. |
| 8,822,954 B2 | 9/2014 | Li et al. |
| 8,828,271 B2 | 9/2014 | Zhang |
| 9,162,513 B2 | 10/2015 | Pawlik et al. |
| 9,622,613 B2 | 4/2017 | Sullivan et al. |
| 2013/0153118 A1 | 6/2013 | Friedrich |
| 2015/0056331 A1 | 2/2015 | Rivera |
| 2016/0267369 A1 | 9/2016 | Picard et al. |
| 2017/0215632 A1 | 8/2017 | Tinkler et al. |
| 2017/0295988 A1 | 10/2017 | Chung |
| 2020/0279383 A1* | 9/2020 | Kurtoglu ................ G01N 21/88 |

FOREIGN PATENT DOCUMENTS

| | | |
|---|---|---|
| KR | 1038035 B1 | 5/2011 |
| KR | 1411063 B1 | 7/2014 |

\* cited by examiner

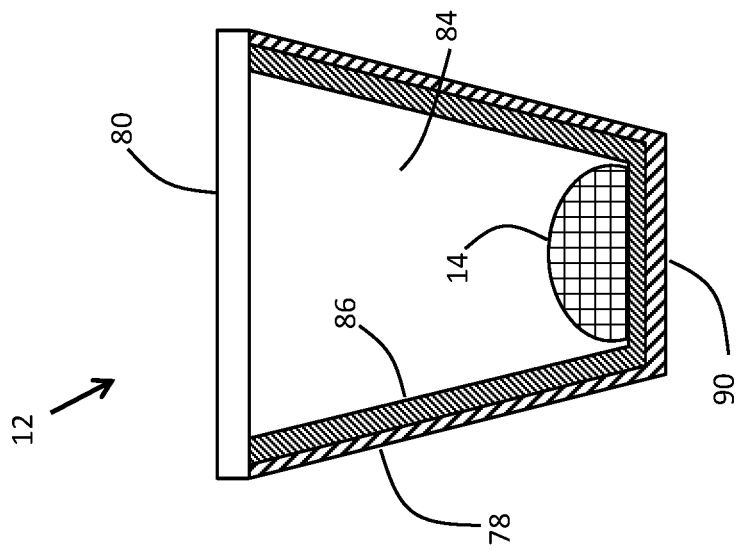
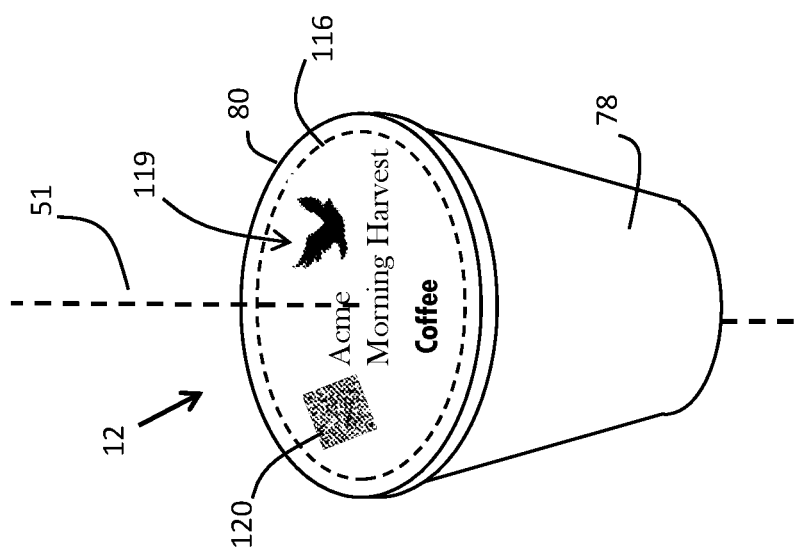
Fig. 5
Fig. 4

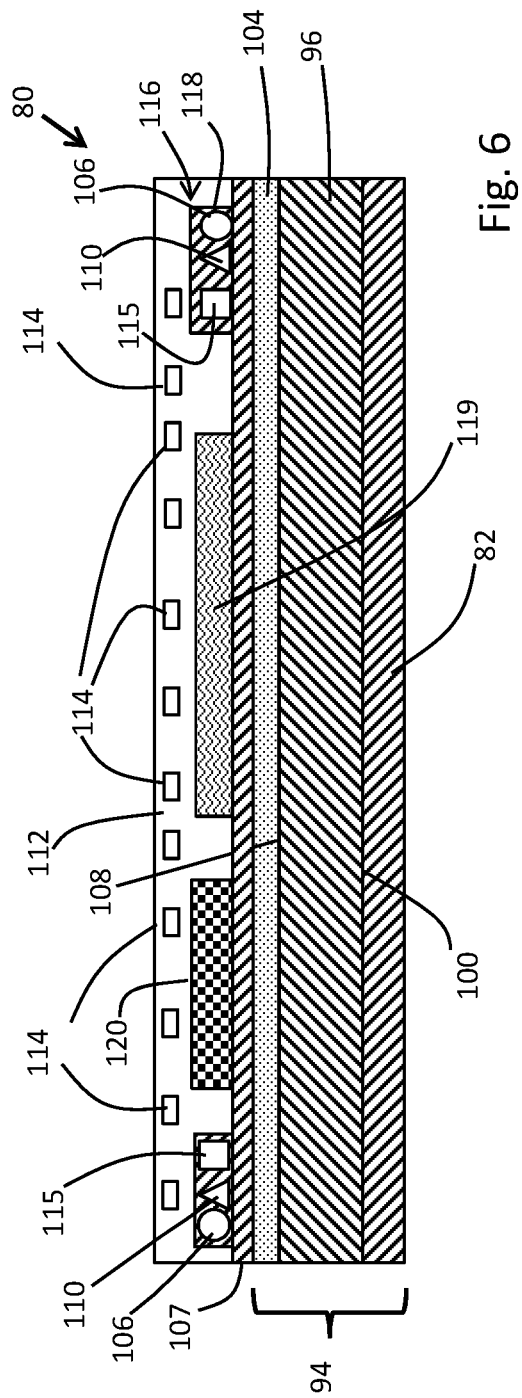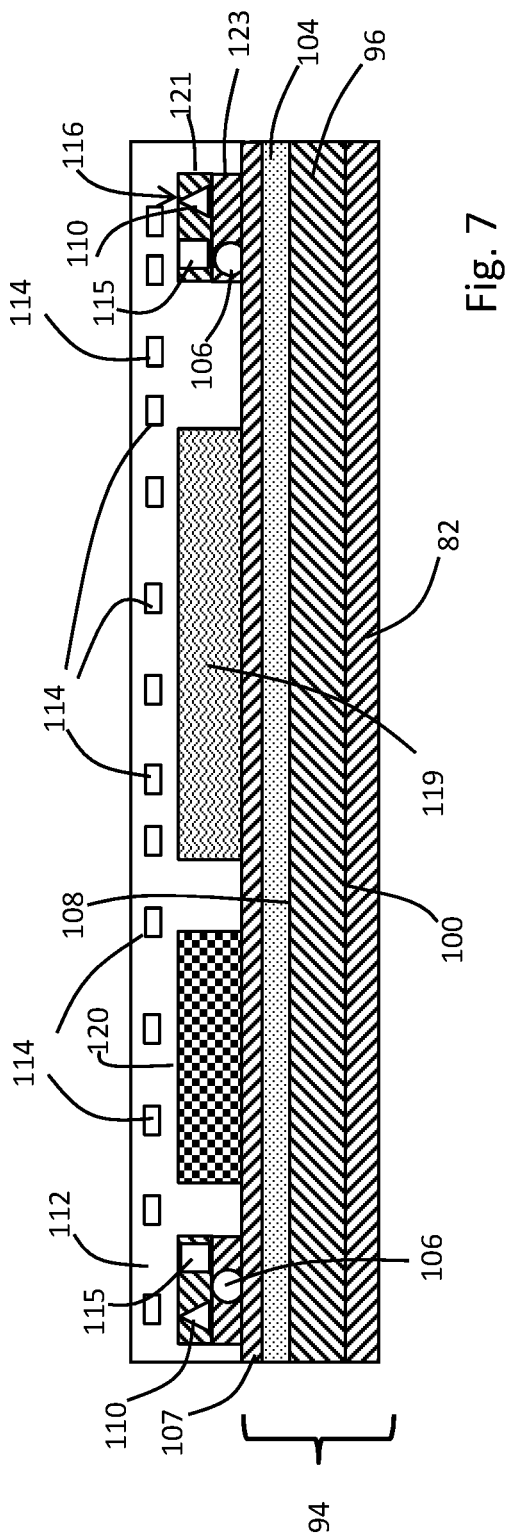

SPECTRAL SIGNATURE SYSTEMS THAT USE ENCODED IMAGE DATA AND ENCODED SPECTRAL SIGNATURE DATA

PRIORITY

This application claims priority to U.S. Provisional Patent Application No. 62/845,018, filed May 8, 2019, titled SPECTRAL SIGNATURE SYSTEMS THAT USE ENCODED IMAGE DATA AND ENCODED SPECTRAL SIGNATURE DATA, in the names of Brian J. Brogger et al., the entire disclosure of which is incorporated herein by reference for all purposes.

FIELD OF THE INVENTION

The disclosed embodiments are generally directed to spectral signature strategies that can be used to authenticate a wide range of substrates such as packaging, labels to be used on packages or other articles, and the like. The disclosed embodiments are particularly useful in food and beverage preparation systems, and more particularly to food and beverage preparation systems of the type in which a machine prepares food or beverage items from a food and beverage precursor held in a pod and a liquid supply, wherein the system is arranged to sense, share and use pod image data, spectral signature data, and machine operation data.

BACKGROUND OF THE INVENTION

Many documents, packages, products and product combinations are known in which it is useful to be able to automatically identify and/or authenticate the items or workpieces so that appropriate automated processes, identification, authentication, inventory practice, pricing, remote data harvesting, or the like can be carried out. Examples of such products and product combinations include food and beverage preparation systems, glucose test strips and their corresponding glucose monitoring, respiratory medicines stored in sealed packages and corresponding inhaler devices, consumer worn devices (such as disposable hybrid microfluidic devices, smart contact lenses integrated with glucose sensors), printers and ink cartridges, capital equipment and consumables (such as belts, adhesive pads, and fasteners), lab analysis equipment and consumables (such as lab testing units, pipettes, vials), aircraft engines and consumables (such as cleaning solutions, jointing, crack detection, feeder rollers), check scanners in the banking industry and consumables (such as ink jet cartridges, franking rollers, cleaning cards, feeder rollers), industrial machines and consumables (such as squeegees, batteries, brushes, hoses, filters, engine parts) and the like.

Products liability protection also may benefit from authentication strategies that allow a company's own products to be easily distinguished from products of others. Any product susceptible to source confusion, counterfeiting, or grey market importation can benefit from identification and authentication strategies. Marketing strategies also may involve remotely gathering data from products being used so that marketing decisions, customer service, product performance, and the like can be managed or improved.

Bar codes have been placed on products as one technique to quickly identify a product. As a result of the large and growing scale of the Internet of Things (IOT), barcode data is being imaged (e.g., through scanning or 2D image capture), transmitted, and remotely processed. It can be challenging to verify if a local bar code is authentic or if bar code data being transmitted is from a particular source. Bar codes are not able to easily solve this problem on their own. Even if information in a bar code is encrypted, a bar code is easily copied. Bar code fakes are easy to pass as an authentic bar code.

Very popular systems for preparing food and beverages use pods, or capsules that contain food or beverage ingredients useful to make consumable items such as coffee, tea, hot chocolate, hot cider, soup, oatmeal, juice, pudding, sauces, baby food, gravies, dressings, condiments, soft-serve butter or other spreads, carbonated beverages, alcoholic beverages, nutraceuticals, medicines (e.g., Theraflu brand medicament, etc.), energy drinks, and the like. The pods hold a specific amount of ingredients to make a designated serving size. For example, some pods may hold enough ingredients to make a single serving. Other pods provide multiple servings.

Examples of such systems are described in U.S. Pat. Nos. 8,495,949; 9,622,613; 7,165,488; and 7,523,695; as well as U.S. Pub. Nos. 2017/0295988; 2016/0267369; and 2017/0215632. The brewing machines of U.S. Pub. Nos. 2017/0295988 and 2017/0215632 incorporate "smart brewer" capabilities in that the brewers harvest and use pod data to help implement brewer functions. Other examples of known brewing machines include K-cup brewing machines commercially available under trade designations including "KEURIG" and the like.

In a typical preparation, a pod is placed into a preparation machine. Pods typically include a base cup and a lid that seals the cup. When the pod is inserted into a brewing machine, a piercing element on a supply line punctures the lid so that liquid, often stored in a refillable tank incorporated into the machine and heated prior to delivery to the pod, can enter the pod through the supply line. The heated liquid and pod ingredients interact to form the desired food or beverage. When the pod was inserted into the machine, an outlet piercing element on an outlet conduit punctures the bottom of the pod. This allows the prepared food or beverage item to be dispensed from the pod through the outlet conduit. In some instances, the dispensed food or beverage (e.g., coffee or tea prepared from insoluble precursors) flows through a filter in the pod prior to entering the outlet conduit. The filter helps to prevent the used pod ingredients from leaving the pod. In other instances where the precursor dissolves in the liquid (e.g., hot chocolate, cider, or the like) a filter is not needed. The food or beverage may then be collected in a suitable mug, glass, cup, bowl, or other container.

The base cup and lid of a typical pod form a sealed chamber to hold the pod ingredients. In additional to graphic and textual information that helps a user to identify a pod, many commercially available lids incorporate useful information encoded onto lids in machine readable form. The encoded data often is present in two forms. First, information about the pod may be encoded in a bar coded image printed on the lid. These can be any kind of bar coded image such as those based on linear or 2d bar codes. The bar coded information may encode data relating to the pod such as the commercial source, brand, SKU, type of ingredients, pod size, date of production, lot, location of production, and the like.

Unfortunately, bar codes are susceptible to counterfeiting even when encrypted, as a bar code can be easily copied. Additionally, some malicious bar codes may incorporate viruses or other harmful code. Strategies are needed to make bar codes more resistant to copying or malicious intent.

Spectral signature features have been incorporated into a printed ring around the perimeter of the lid. The spectral signature features are provided by taggant compounds incorporated into the ink used to form the ring. The taggant compounds are luminescent. When illuminated with light from a suitable LED light source, the compounds absorb the light and emit a luminescent response at specific wavelengths. A spectral detector detects the response. The resultant spectral data incorporates information indicative of the intensity of the luminescent emissions as a function of wavelength. The characteristics of the spectrum encode the desired spectral signature. The nature of the spectral signature is created not only as a result of the combination of taggant compounds used, but also other factors including the ink formulations used as a carrier for the taggants, overprint varnish, print techniques and tolerances by which the taggant inks are applied, and sealing (lid attachment) techniques by which the lids are attached to the corresponding base containers. The composite characteristics of the resultant spectral information serve as a unique fingerprint or spectral signature to confirm the presence of the correct taggant compounds in the correct relative amounts that have been applied in the proper way.

The spectral signature features incorporated into the ring on the lid may serve many functions. For example, given the ability of the spectral signature to function like a unique fingerprint, the spectral signature can be used to authenticate the pod as coming from a particular source. This can help prevent against counterfeit pods. Also, by using unique signatures with different kinds of pod ingredients, the signature can be used to help automatically select and implement different recipes depending on the pod being used.

Some of the commercially available brewing machines have been fitted with a 450 to 490 nm LED light source (i.e., a blue light LED light source) and a spectral detector. The spectral detector also has been fitted with an optical filter. The LED light source illuminates the spectral ring. The spectral detector detects the resultant luminescent emissions (if any). The optical filter blocks light wavelengths of 550 nm or less (e.g., mainly ultraviolet light, violet light, blue light, and green light) from reaching the detector. The optical filter helps to ensure that the luminescent emissions associated with wavelengths over 550 nm can reach the detector while the LED illumination is blocked. Although the LED illumination theoretically can be distinguished from the spectral signature emissions, the LED illumination would expose the detector to too much light intensity. This washing out effect would make it practically difficult to detect signature features with appropriate resolution or even not at all.

In addition to the taggant compounds incorporated into the printed ring on the pod lids, pod lids have included an optical brightener compound. An optical brightener makes a lid look visibly whiter and brighter to a pod user. An optical brightener typically absorbs ultraviolet let or violet light and re-emits light in the blue region of the electromagnetic spectrum (e.g., about 420 nm to about 500 nm). The optical filter incorporated into previously known brewing machines blocks wavelengths of 500 nm or less from reaching the spectral detector. Hence, these optical filters prevent the luminescent emissions of an optical brightener in the regime from 420 nm to 500 nm from reaching the detector.

Some of the commercially available brewing machines also have been fitted with an infrared LED illumination source. This source is used to detect the presence of a pod in a brewing chamber. The IR LED illumination source is triggered to illuminate the chamber. A detector is positioned to detect reflectance if a pod is present. This can be the same detector used to detect luminescent emissions of other taggant compound when illuminated with a different LED illumination source. However, the infrared LED illumination source in the commercial machines is not able to be used with respect to spectral signature strategies because the field of view of the associated detector is too large. This causes centrally located graphics to be included in the scan data to too much of a degree, compromising the IR reading.

There is a need for improved spectral signature strategies for use in systems that prepare food and beverages from pods that contain food or beverage ingredients useful to make consumable items. Also, more strategies for creating spectral signatures are needed so that more kinds of items can be uniquely associated with different signatures. This would allow more items to be uniquely authenticated. Also, a greater number of unique signatures could be associated with a greater number of preparation functions. As counterfeiters become more aggressive, more complex signatures could be harder to reverse engineer or duplicate.

SUMMARY OF THE INVENTION

The present invention provides improved spectral signature strategies for use in a wide range of product and service applications. The strategies allow automated activities such as preparation or other manufacturing, inventory control, pricing (e.g., grocery checkout) systems, identification, authentication, malware protection, remove data harvesting, or the like. Examples of such products and product combinations include food and beverage preparation systems, glucose test strips and their corresponding glucose monitoring, respiratory medicines stored in sealed packages and corresponding inhaler devices, and the like. Products liability protection also benefit from authentication strategies that allow a company's own products to be easily distinguished from products of others. Any product susceptible to source confusion, counterfeiting, or grey market importation can benefit from identification and authentication strategies. Marketing strategies also may involve remotely gathering data from products being used so that marketing decisions, customer service, product performance, and the like can be managed or improved. In illustrative modes of practice, the principles of the present invention are useful in systems that automatically prepare food and beverages from pods that contain food or beverage ingredients useful to make consumable items.

In one aspect, the present invention provides strategies to enhance the security of bar codes. Illustrative strategies to help to securely identify bar codes include using these in combination with spectral signature systems that provide a secondary way to confirm that a product marked with a bar code has been supplied from a particular source. In addition to help authenticate bar codes on pods, spectral signatures can be used to assist with food and beverage preparation functions or to help ensure the accuracy of use and other data that might be remotely harvested from a plurality of users in different locations.

The present invention also provides strategies to create new kinds of spectral signatures. In one strategy, the present invention appreciates that the luminescent emissions of optical brightener compounds in the blue light regime from about 420 nm to about 500 nm incorporate useful spectral signature features, but the conventional brewing systems incorporate features that make it impossible to take advantage of the spectral signature opportunities offered by optical brightener compounds in the blue light regime. Those systems have used LED illumination with a central peak of 450 nm to 460 nm. Even if algorithms can be used to isolate the detected LED illumination from the detected spectral luminescence, the spectral detectors in commercial machines includes an optical filter that blocks the blue light and other emissions under 550 nm from ever reaching the detector. This is done so that the LED illumination does not overwhelm the detector to prevent spectral signature detection. Hence, these conventional systems are unable to detect blue spectral emissions of the optical brighteners.

The present invention modifies the systems so that spectral signature strategies can include features of the spectra emitted by optical brightener compounds in the blue light regime. As one aspect of this strategy, machines are fitted with an illumination system that illuminates pods with a bandwidth including ultraviolet and/or violet light when an optical brightener is used to encode at least a portion of a spectral signature. This makes the illumination distinct from the blue light bandwidth (and optionally higher bandwidths) of luminescent emissions of the optical brighteners. Further, whereas conventional systems use optical filters that block light having wavelengths below about 550 nm from reaching a spectral detector, the present invention may use an optical filter that blocks ultraviolet or violet light associated with illumination while still allowing blue light emissions to reach the spectral detector.

Further, the blue light regime of the optical brighteners is used to derive spectral signatures. For example, the nature of the resultant spectral data in the blue light regime may be used to indicate whether the optical brightener is present or absent. In other examples, the relative intensity of certain spectral peaks relative to peaks of other luminescent compound(s) can be incorporated into a spectral signature. Consequently, an illustrative taggant system desirably includes at least one optical brightener used in combination with one or more other kinds of luminescent compounds.

The present invention also appreciates that when an infrared (IR) absorbing compound is incorporated as a taggant into a taggant system, the response of these compounds under illumination including at least infrared wavelengths may be incorporated into a spectral signature. Examples of IR illumination sources include but are not limited to infrared LED illumination sources or broad band white light LED sources whose illumination includes infrared wavelengths. For example, the characteristics of reflected illumination in one or more IR bandwidths of a reflection spectrum may indicate whether the infrared absorbing compound is present or absent. If the reflected illumination is attenuated relative to the incident illumination beyond a certain degree, this would indicate the presence of the compound since a relatively large amount of the fluence was absorbed rather than reflected. If the reflected illumination does not show a corresponding depression of reflectance intensity in one or more IR bandwidths, this would indicate that the infrared absorbing compound is not present.

As discussed above in the background section, some commercial brewing systems are already fitted with an IR LED illumination source. This source is used with a corresponding detector in order to detect whether a pod is present in a brewing chamber or not. In the practice of the present invention, the control system may be augmented with a suitable algorithm in order to monitor the degree of reflectance in order to detect the presence of one or more infrared absorbing compounds incorporated as a taggant into a taggant system.

Advantageously, integrating the spectral properties of optical brightener compounds and/or IR absorbing compounds into taggant signature systems provides the result that a greater number of taggant compounds can be used singly and in combinations to provide a greater number of unique spectral signature codes. The compounds may be used in specific amounts and/or relative amounts in order to encode at least some features of a spectral signature code. The resultant signatures can be harder for others to reverse engineer. This helps to protect against counterfeiters. Further, taggant compounds can be deployed in more locations and in a greater number of relative ratios to further enhance the protection and versatility provided by the system.

For example, consider an illustrative example in which one of an optical brightener compound and/or an IR absorbing compound is used in combination with one other luminescent compound to help provide a taggant system. Using only the other luminescent compound, practically only one spectral code would be available based on the presence of the compound. Using one of the optical brightener compound and/or an IR absorbing compound triples the number of code possibilities. First, a code can be based on the presence of the optical brightener compound and/or an IR absorbing compound. A second code can be based on the presence of only the other luminescent compound. A third code is based on the presence of both the other luminescent compound and one of the optical brightener compound and/or an IR absorbing compound. If both the optical brightener compound and an IR absorbing compound are used, the number of codes increases to 7, because each can be used on its own, they can be used in unique pairs, and all three can be used together.

If two other luminescent compounds are used in combination with one or both the optical brightener compound and the IR absorbing compound, 15 unique codes could be used based on using each on its own, in unique pairs, in unique triples, or all 4 (a quad embodiment) together. Further opportunities to expand the number of codes are available by varying the ratio of the two other luminescent compounds in pairs, triples, or the quad embodiments.

Using optical brighteners and/or infrared absorbing compounds into signature encoding strategies provides additional advantages as well. In some embodiments in which compounds such as organic dyes are used as luminescent taggant compounds, a problem is that the compounds can degrade over time. Therefore, the luminescent spectra of such compounds can change over time as the compounds themselves change. When signature features are derived from particular zones of the spectra, the spectra in these zones over time may become too similar or otherwise may become more difficult to differentiate. Advantageously, optical brighteners and infrared absorber compounds provide signature zones with significantly different features than those of luminescent, organic dyes. Signature features of optical brighteners and infrared absorber compounds are so different that one or both of these can be used in combination with luminescent organic dyes with a dramatically reduced risk of overlap or confusion among signature zones. This allows signature reading and differentiation to be more robust over time, even if the spectra of the luminescent organic dyes shift over time.

Further, the harvesting of spectral signature data from users allows signature definitions to be monitored and updated or upgraded over time. Data from multiple users can be transmitted to a centralized control resource. The signature readings can be analyzed for variance. Signature definitions can be updated to accommodate the real world data, and the updated information can be transmitted out to machines. This helps make signature definitions better over time and helps to maintain robust and accurate signature-based identification, authentication, and other uses. This updating practice would take into account that signature features and zones are a result of many factors including not just the taggant compounds at issue, but also tolerances and variation associated with formulating into inks, printing, sealing, detecting, and the like. Collection of data from a plurality of real world uses can help to account for production variance, degradation, sensor variation, and the like. In particular, the data can help to define tighter signature definitions, which is beneficial because tighter signature definitions are more secure.

In one aspect, the present invention relates to a spectral signature system useful for authenticating a bar code image on a substrate, said spectral signature system comprising:
 a) a spectral signature pre-associated with the bar code image, wherein at least a portion of the spectral signature is encoded in spectral characteristics of at least one optical brightener compound and/or in spectral characteristics of at least one infrared absorbing compound, and wherein at least a portion of the spectral signature is encoded in spectral characteristics of at least one additional luminescent taggant compound;
 b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature;
 c) a taggant system that encodes the spectral signature, wherein the taggant system includes:
  i) at least one of the optical brightener compound and/or the infrared absorbing compound; and
  ii) the at least one additional luminescent taggant compound; and
 d) optionally a control system comprising program instructions that evaluate information comprising spectral data emitted by the substrate to determine information indicative of whether the substrate comprises said taggant system encoding the spectral signature.

In one aspect, the present invention relates to a spectral signature system useful for authenticating a substrate, said spectral signature system comprising:
 a) a spectral signature pre-associated with the substrate, wherein at least a portion of the spectral signature is encoded in spectral characteristics of at least one optical brightener compound and/or in spectral characteristics of at least one infrared absorbing compound, and wherein at least a portion of the spectral signature is encoded in spectral characteristics of at least one additional luminescent taggant compound;
 b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature;
 c) a taggant system that encodes the spectral signature, wherein the taggant system includes:
  i) at least one of the optical brightener compound and/or the infrared absorbing compound; and
  ii) the at least one additional luminescent taggant compound; and
 c) optionally a control system comprising program instructions that evaluate information comprising spectral data emitted by the substrate to determine information indicative of whether the substrate comprises said taggant system encoding the spectral signature.

In one aspect, the present invention relates to a spectral signature system useful to authenticate a bar code on a food package, said spectral signature system comprising:
 a) a spectral signature pre-associated with the bar code image, wherein at least a portion of the spectral signature is encoded in spectral characteristics of at least one optical brightener compound and/or in spectral characteristics of at least one infrared absorbing compound, and wherein at least a portion of the spectral signature is encoded in spectral characteristics of at least one additional luminescent taggant compound;
 b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature;
 c) a taggant system that encodes the spectral signature, wherein the taggant system includes:
  i) at least one of the optical brightener compound and/or the infrared absorbing compound; and
  ii) the at least one additional luminescent taggant compound; and
 d) optionally a control system comprising program instructions that evaluate information comprising spectral data emitted by the food package to determine information indicative of whether the food package comprises said taggant system encoding the spectral signature.

In one aspect, the present invention relates to a method of preparing a consumable substance from at least first and second consumable substance precursors, comprising the steps of:
 a) providing a consumable substance storage pod comprising the first consumable substance precursor stored in the consumable substance storage pod and further comprising at least one bar code image provided on a surface of the consumable substance storage pod, said at least one bar code image including encoded image data that is indicative of a characteristic of the first consumable substance precursor stored in the consumable substance storage pod;
 b) providing a spectral signature that is pre-associated with the consumable substance storage pod, wherein at least a portion of the spectral signature is encoded in spectral characteristics of at least one optical brightener compound and/or in spectral characteristics of at least one infrared absorbing compound;

c) illuminating a surface of the consumable storage pod with an illumination system, wherein the illumination system comprises a first illumination if the optical brightener compound encodes at least a portion of the spectral signature and/or second illumination if the infrared absorbing compound encodes at least a portion of the spectral signature, wherein the first illumination includes at least ultraviolet and/or violet illumination in one or more portions of a wavelength range from 200 nm to 420 nm, and wherein the second illumination includes at least infrared illumination in one or more portions of a wavelength range from 700 nm to 1200 nm;

d) evaluating information comprising spectral data emitted by the pod in response to illumination in step c) in order to determine information indicative of whether the spectral data encodes the spectral signature;

e) using the information in step d) to determine information indicative of a source of the pod;

f) capturing image data of the at least one bar code image; and g) using at least the captured image data to cause a consumable substance to be prepared from ingredients comprising the first and second consumable substance precursors.

In one aspect, the present invention relates to a preparation system used to prepare a consumable substance from ingredients comprising a first consumable substance precursor held in a consumable substance storage pod and a second, fluid, consumable substance precursor, said system comprising:

a) a spectral signature that is pre-associated with the pod, wherein at least a portion of the spectral signature is encoded in optical characteristics of at least one optical brightener compound and/or in optical characteristics of at least one infrared absorbing compound;

b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature;

c) a fluid supply including at least the second consumable substance precursor;

d) a preparation chamber that holds the consumable substance storage pod during at least a portion of a preparation carried out to prepare the consumable substance from ingredients comprising at least the first and second consumable substance precursors;

e) an imaging device positioned in a manner effective to capture image data of at least a portion of the consumable substance storage pod when the pod is held in the preparation chamber; and f) a detector system comprising at least one detector positioned in a manner effective to detect the spectral characteristics of the pod when s held in the preparation chamber and illuminated with the illumination system.

In one aspect, the present invention relates to a method of making a beverage pod system, comprising the steps of:

a) providing a spectral signature system comprising a plurality of unique spectral signature codes comprising first and second spectral codes, wherein the first and second spectral codes are different, wherein at least a portion of at least one of the first and second spectral signature codes is encoded in optical characteristics of a taggant system comprising at least one optical brightener compound and/or in optical characteristics of at least one infrared absorbing compound;

b) associating a first beverage pod with the first spectral signature code;

c) incorporating the first spectral signature code onto a surface of the first beverage pod;

d) associating a second beverage pod with the second spectral signature code; and e) incorporating the second spectral signature code onto a surface of the second beverage pod.

BRIEF DESCRIPTION OF THE DRAWINGS

FIG. 4 shows a perspective view of a food and beverage pod used in the system of FIG. 1.

FIG. 5 shows a side cross-section view of the pod of FIG. 4.

FIG. 6 schematically shows a side cross-section view of a lid used in the pod of FIG. 4.

FIG. 7 schematically shows a side cross-section view of an alternative lid useful in the pod of FIG. 4.

DETAILED DESCRIPTION OF PRESENT PREFERRED EMBODIMENTS

Figure 1:
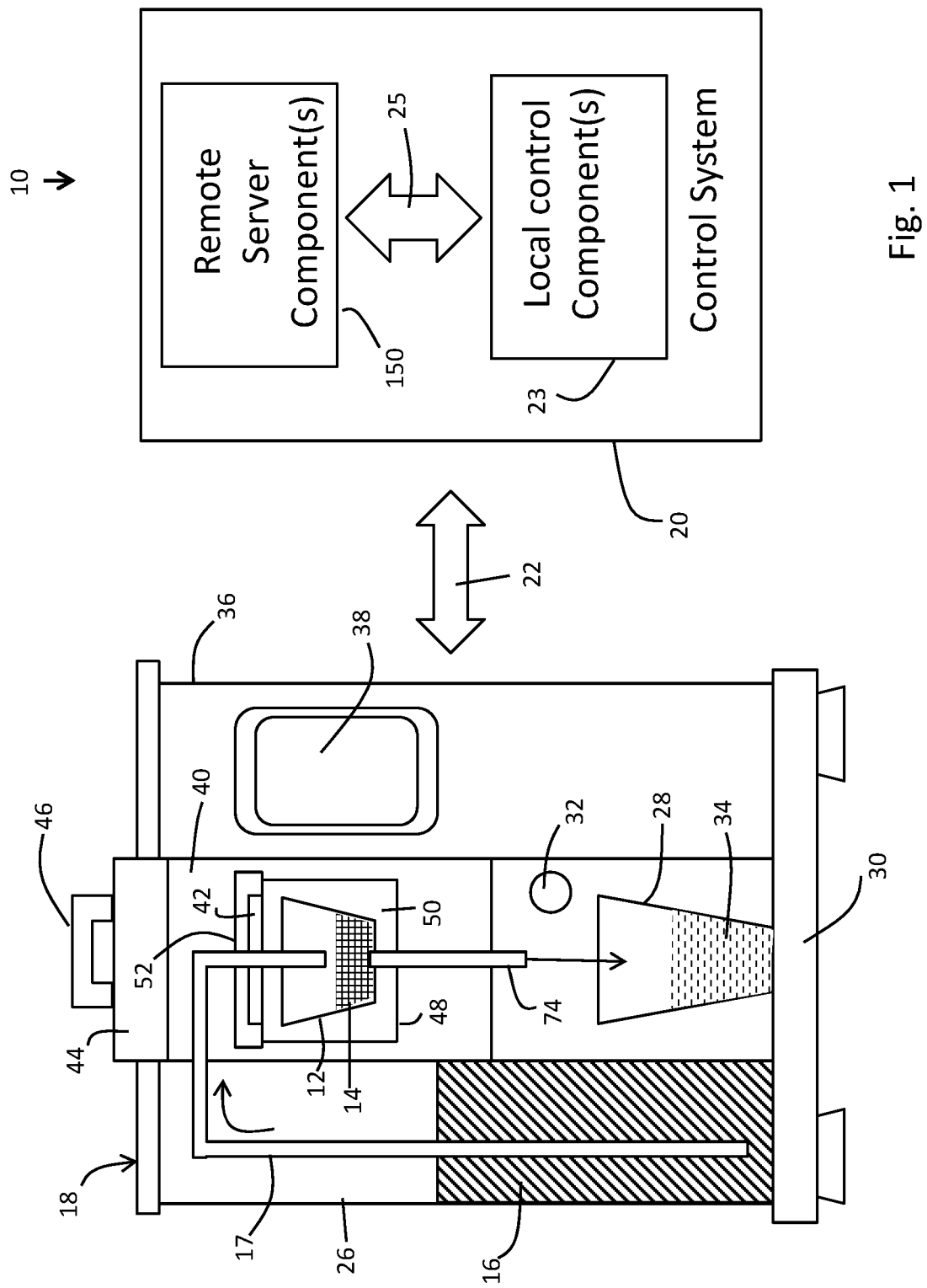
FIG. 1 schematically shows a food and beverage preparation system of the present invention that uses encoded image data and encoded spectral signature data.

The present invention will now be further described with reference to the following illustrative embodiments. The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

FIGS. 1 to 7 show one embodiment of a food and/or beverage preparation system 10 of the present invention that incorporates enhanced spectral signature capabilities for integrating or otherwise linking a consumable substance storage pod 12 to one or more functions of system 10. Such functions may include for example, functions that relate to brewing operations, data gathering, pod authentication (including authentication of a bar code incorporated onto the pod) or pod identification, and/or the like. Food preparation system 10 can be used to prepare a wide variety of consumable food or beverage substances using ingredients comprising at least first and second consumable substance precursors 14 and 16. Examples of food and beverage items that can be prepared using system 10 include coffee, tea, soup, juice, cocoa, cider, pudding, sauces, gravies, dressings, condiments, soft-serve butter or other spreads, carbonated beverages, alcoholic beverages, or the like.

In many embodiments, the first consumable substance precursor 14 includes a solid (e.g., powder, granules, minced leaves, spices, etc.), gel, and/or liquid media, and the second consumable substance precursor 16 comprises a liquid. According to a preparation process, the second consumable substance precursor 16 in the form of a liquid is caused to interact with the first consumable substance precursor 14 in a manner effective to help prepare the desired consumable food or beverage item 34.

The first and second precursors 14 and 16 can interact in different ways. In an illustrative example, precursor 14 contributes flavor, color, texture, and/or other characteristics that are extracted into the liquid precursor 16 in order to prepare the resultant consumable beverage or food item 34. In another example, all or a portion of the first precursor 14 is dissolved into the second precursor 16 to prepare the resultant consumable food or beverage item 34. In another example, all or a portion of the first precursor 14 is suspended or otherwise dispersed in the second precursor 16 to prepare the resultant consumable beverage or food item 34. In still another example, the first and second precursors 14 and 16 chemically react to form at least a portion of the desired consumable item 34. In some examples, combinations of two or more of such extraction, dissolution, suspension, and/or reaction mechanisms occur when precursors 14 and 16 interact to prepare the food or beverage item 34.

In a specific example, the first precursor 14 includes coffee grounds and the second precursor comprises water 14. The water is heated and contacts the coffee grounds to form a liquid coffee beverage. In another specific example, the first precursor 14 includes ground tea leaves and an assortment of flavoring aids such as spices, and the second precursor 16 comprises water. The water is heated and contacts the tea materials to form a tea beverage. In these examples, the brewed beverage is collected in a suitable container 28 for storage, serving, consumption, or other use by one or more users.

Figure 2:
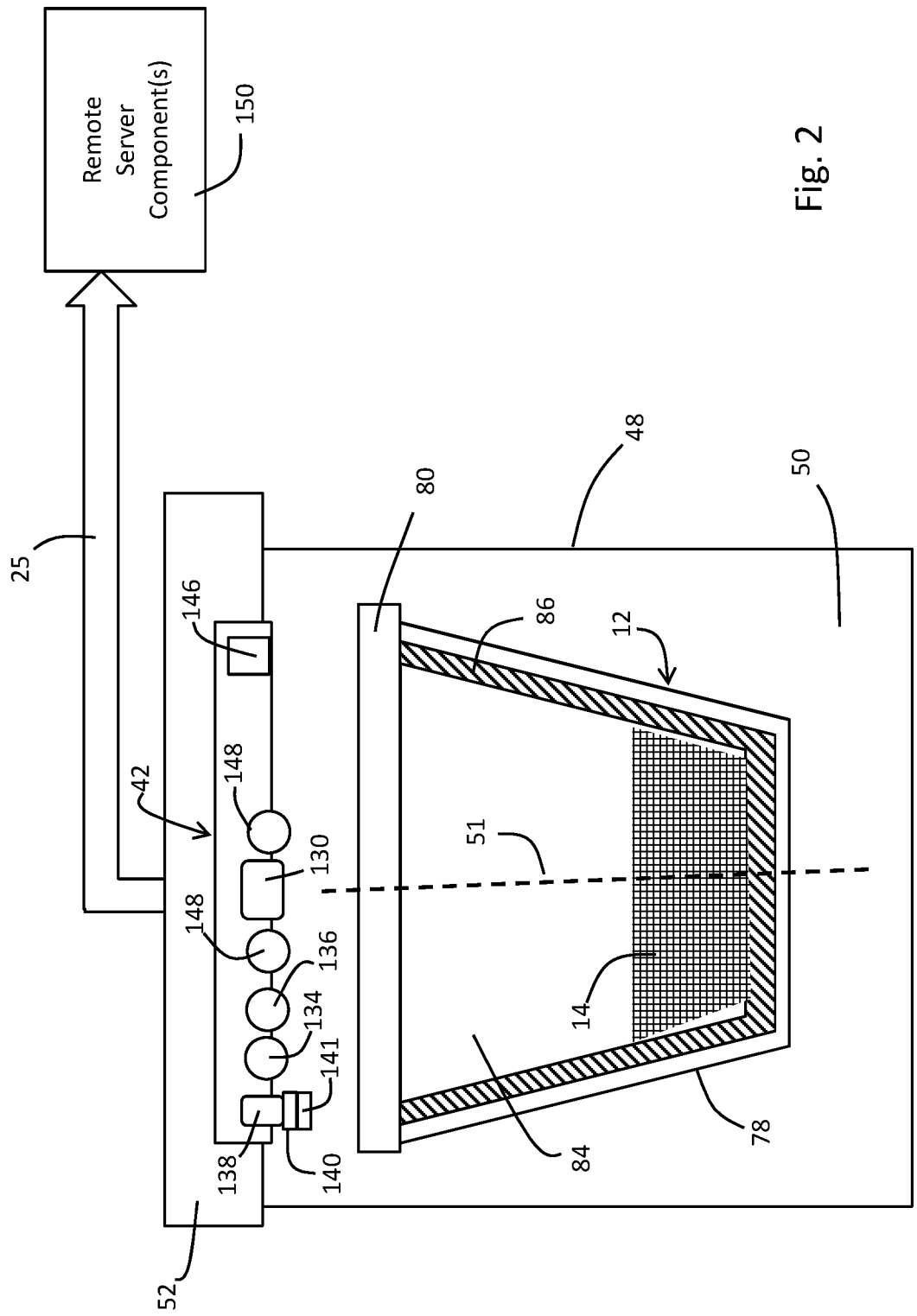
FIG. 2 schematically illustrates an enclosed station used in the system of FIG. 1 to hold a food or beverage pod during data harvesting and/or preparation operations.
Figure 3:
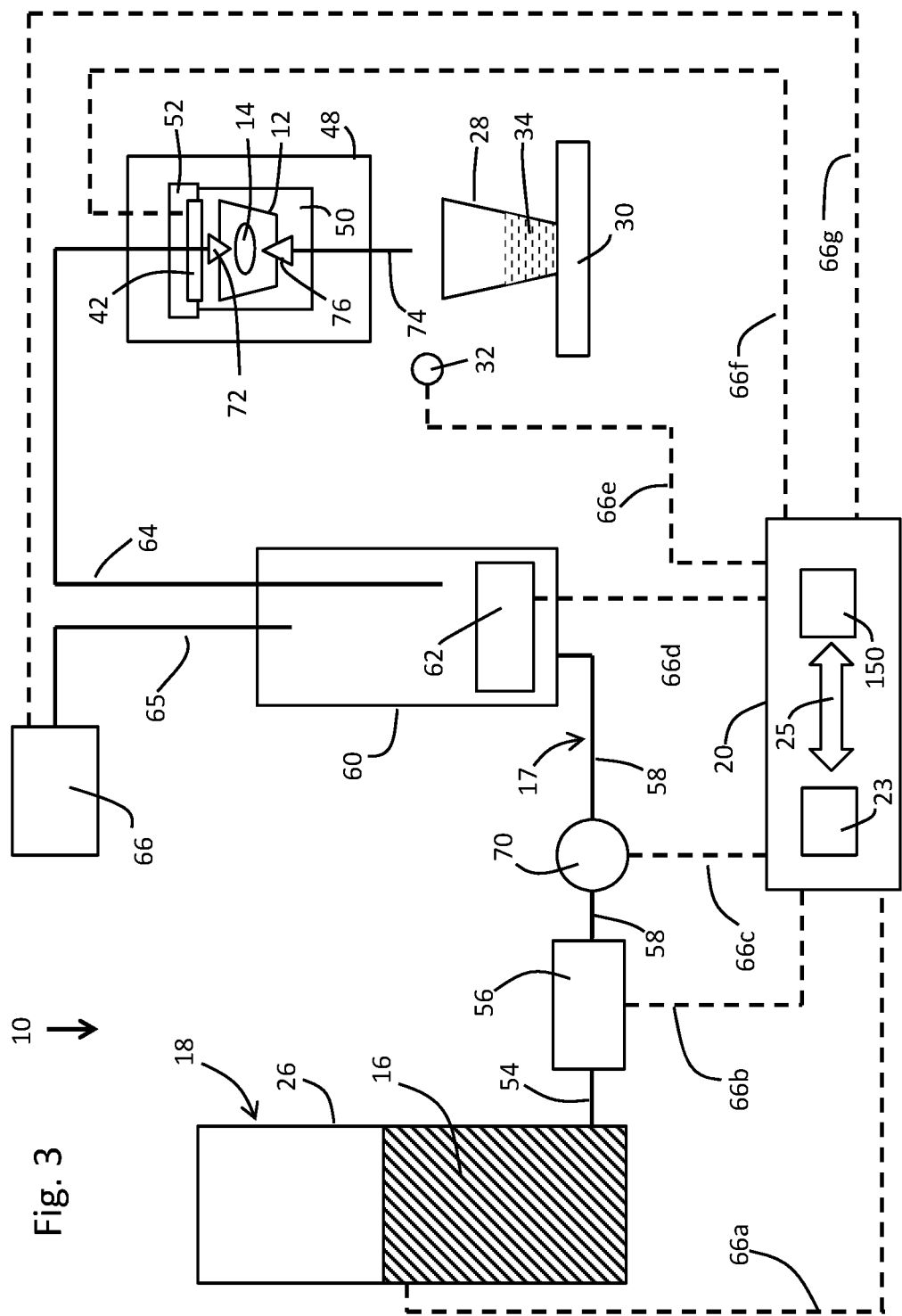
FIG. 3 schematically illustrates a block diagram of the system of FIG. 1.

Referring mainly to FIGS. 1 to 3, system 10 includes as main components pod 12 holding first precursor 14, second precursor 16 (often a liquid such as water), brewing machine 18, and control system 20. System 10 is illustrated in the form of an embodiment that prepares heated food or beverages from ingredients including the first food or beverage precursor 14 stored in pod 12 and the second precursor 16 in a form of a liquid supply stored in refillable storage tank 26. Control system 20 causes refillable storage tank 26 to supply a suitable amount of the liquid precursor 16 through supply pathway 17 to preparation chamber 40 in order to prepare the desired food or beverage item 34 in a desired quantity. The resultant food or beverage item 34 is deposited into a suitable food container 28 such as a cup, bowl, carafe, pot, mug, glass, or the like through outlet line 74. The container 28 is placed on pad 30 to receive the prepared food or beverage 34. An optional sensor (e.g., which may be in the form a spectral detector capable of detecting at least IR bandwidths as discussed further below) 32 may be used to detect if container 28 is properly positioned on base 30 before a preparation operation is allowed to be carried out. If a position error is triggered, such as if the container 28 is not present or is not placed properly on pad 30, control system 20 may cause preparation to be held off until container 28 is properly placed on pad 30. However, data gathering from pod 12, decoding data to read encoded information gathered from pod 12, using spectral signature detection to authenticate encoded image information, or other data-related system functions may still be carried out even if preparation is delayed due to a position placement error of container 28.

As shown schematically in FIG. 1, machine 18 includes housing 36 enclosing functional compartments and components used to carry out food or beverage preparation and optionally at least some onboard aspects of data operations associated with pod identification, pod authentication, recipe selection, recipe implementation, brewing data, user data, malware protection, and/or the like. Communication between machine 18 and control system 20 may occur to carry out preparation and data functions via communication pathways 22. Some local component(s) 23 of control system 20 may be incorporated onboard into machine 18. Other components of control system 20 may be incorporated into remote server component(s) 150 or the like that communicate with the local component(s) 23 via wired and/or wireless connections 25. A user panel 38 (which may include, e.g., one or more of a touch screen, a display screen, physical buttons or levers, and/or the like) provides a user interface for a user to interact with the machine 18.

Pod 12 is held in preparation station 40 during the preparation. Sensor system 42 is deployed in station 40 in order to implement data sensing functions (described further below) to acquire encoded image information, to acquire encoded spectral signature information, and to perform other data functions also while pod 12 is held in preparation station 40.

FIGS. 2 and 4 to 7 (FIG. 7 shows a lid structure that is identical to the lid structure of FIG. 6 except that FIG. 7 deploys taggant compounds in a multilayer taggant ring 116 instead of a single layer taggant ring 116 of FIG. 6) show one example of an illustrative pod 12 in more detail. Pod 12 includes a container 78 and a lid 80 attached to container 78 with an adhesive layer 82 incorporated into lid 80. Container 78 and lid 80 cooperatively define a chamber 84 inside pod 12. Filter 86 is deployed inside chamber 84 in some embodiments such as when the precursor 14 includes insoluble constituents that desirably are separated from the resultant prepared item 34. Additionally, a supply of the first consumable substance precursor 14 is stored in chamber 84 between filter 86 and lid 80. Filter 86 provides a filter barrier between precursor 14 and the bottom 90 of pod 12. The pod 12 can be configured so that chamber 84 is sealed from the ambient, as illustrated. Alternatively, a pod 12 with mesh sides or otherwise open venting to the ambient also may be used. In some cases, the filter 86 may also serve as container 78.

Pod 12 can hold a desired amount of precursor 14 suitable to form the desired amount of consumable food or beverage substance to be prepared from the precursor 14 and the fluid supply 16. For example, some pods 12 hold an amount of precursor 14 suitable to form a single serving size of a beverage. In other instances, some pods 12 hold a sufficient amount of precursor 14 to prepare multiple servings. For purposes of illustration, pod 12 is shown as a type that is suitable to prepare a single serving of coffee, tea, hot cocoa, hot cider, soup, pudding, or other food or beverage.

As seen best in FIGS. 6 and 7, lid 80 includes a substrate 94 that may be formed from one or more layers. As illustrated, substrate 94 has a multilayer structure including base sheet 96 as one component. Base sheet 96 may be formed from a wide range of materials including one or more metals, metal alloys, intermetallic compositions, one or more polymers, one or more ceramics, paper or other cellulosic material, combinations of these, and the like. In one embodiment, base sheet 96 includes an aluminum foil sheet.

Substrate 94 also includes adhesive layer 82 on the inner face 100 of base sheet 96. Adhesive layer 82 is used to attach lid 80 to the container 78 of pod 12. Adhesive layer 82 may be selectively placed onto only one or more portions of the inner face 100. Alternatively, as shown, adhesive layer 82 is applied with full coverage over inner face 100.

Substrate 94 further includes primer layer 104 applied onto outer face 108 of base sheet 96. Primer layer 104 helps to improve adhesion of additional materials and information that are printed, coated, or otherwise affixed to lid 80. Primer layer 104 may be clear or colored in any desired fashion. Often, a base, opaque printed layer 107 is printed over all or one or more portions of primer layer 104 to provide a solid background on which to print indicia 119 and data image 120 onto lid 80. In many embodiments, printed layer 107 is a single, neutral color such as an opaque white or grey, but it can be formed from one or more other printed colors, if desired. Opaque white embodiments of layer 107 are beneficial to help allow brighter visible colors and graphics to be printed onto lid 80. A factor to consider in how to print layer 107 is to ensure that there is sufficient optical contrast between the background provided by layer 107 and the data image 120 to allow it to be read (which includes scanning in the case of a linear bar code embodiment, or scanning or 2d imaging for a 2D bar code embodiment) and then decoded by control system 20 or other suitable decoding device.

Different kinds of product indicia 119 may be formed on layer 107. For example, product indicia 119 can be printed onto layer 107. Product indicia 119 can convey different information associated with the pod 12 and/or the precursor 14 held in pod 12. Example of such information includes the source of the pod, the type of pod, the brand name of the pod 12, the type of product stored in pod 12, graphic images, ingredients of the precursor 14, instructions or a code linked to instructions for preparing a food or beverage item, authentication information, and/or the like. For purposes of illustration, product indicia 119 shows the source (ACME), brand (Morning Harvest), product type (coffee) and a logo (bird) corresponding to precursor 14.

Data image 120 also is printed onto printed layer 107. Image 120 includes imagable data encoded in a visual pattern readable by machine decoding using suitable decoding algorithms. Such data often is indicative of at least one characteristic of the precursor 14 stored in pod 12. Such data may include information about precursor 14 such as a SKU number associated with the pod 12, the source of the pod 12, the brand name of the pod 12, the type of product stored in pod 12, SKU number, the type of pod, instructions or a code to cause the machine 18 to carry out a corresponding recipe or preparation for a food or beverage item, and/or the like. In many embodiments, the image 120 includes at least one linear or 2D bar code that encodes the imagable data information as the visual pattern readable by machine.

Embodiments of image 120 that encode imagable data in a bar code may store the data in the image using any suitable bar code(s). The Universal Product Code (UPC) is one example of a linear bar code. The UPC code often includes a barcode that encodes a 12-digit UPC number. Six of these digits indicate the manufacturer ID number. The next 5 digits represent the product number. The final digit is a check digit that is used to determine if the code is read properly. A linear barcode such as one that uses the UPC code often encodes mainly alphanumeric information.

A 2D barcode includes a visual pattern in one or more two-dimensional arrays. Often, such an array is square or rectangular, but other shapes may be used. Just like a linear barcode, a 2D bar code encodes imagable data in the form of a machine readable, visual pattern. In contrast to a linear bar code, a 2D barcode can encode substantially more data per unit area. In other words, a 2D barcode stores information at a higher storage density than a linear barcode. A typical 2D barcode can encode at least 2000 alphanumeric characters in illustrative instances in an area under 2.5 $cm^2$, or even under 1.5 $cm^2$, or even under 1 $cm^2$. Also a 2D bar code may encode data redundancies to minimize data loss if a portion of the bar code is damaged. A 2D bar code also may encode error correction for more reliable reading. A 2d bar code also can be read regardless of orientation.

There are several kinds of 2D barcodes. Examples of popular 2D barcodes include QR Code (which includes micro QR Code, iQR Code, SQRC, and FrameQR Code); Aztec code; MaxiCode; PDF417 code, and Semacode. One or more of these and/or other 2D barcodes may be used to form all or a portion of image 120.

In practice, a linear or 2D barcode is read by using an imaging device to capture an image of the barcode. A suitable algorithm is then used to decode the imagable data encoded in the image. In some cases, the decoding functions and the imaging functions may be incorporated in whole or in part into machine 18 itself. Alternatively, after image capture of image 120, the image information can be transmitted via a suitable communication pathway to a remote server component 150 of control system 20 in order to handle decoding to interpret the imagable data stored in image 120.

Lid 80 further incorporates a taggant system as a further strategy to encode information on lid 80 in the form of one or more spectral signatures that are pre-associated with corresponding pods, and often specifically pre-associated with bar codes incorporated onto pods. In some embodiments, at least a portion of a spectral signature code is encoded (a) in spectral characteristics of at least one optical brightener compound 114 emitted in response to illumination including ultraviolet and/or violet illumination and/or (b) in spectral characteristics of at least one infrared absorbing compound 115 in response to illumination including infrared illumination. In some embodiments, both taggant compounds 114 and 115 are present such that portions of the spectral signature code are incorporated into spectral characteristics of both compounds 114 and 115.

Optical brighteners often are luminescent compounds. Accordingly, portions of a spectral signature code may be encoded in at least the blue light regime of the corresponding spectra of optical brightener compound 114. Infrared (IR) absorbing compound 115, in contrast, may not be luminescent in some instances, but rather the absorption of IR light by the infrared absorber compound 115 will manifest as a reduction in the intensity of corresponding reflected IR illumination in one or more IR bandwidth portion(s) of the electromagnetic spectrum. This attenuation or reduction in reflectance intensity may be detected and correlated to the presence of the compound 115. In the absence of such compound(s) 115, the attenuation of reflectance intensity would not be present.

Figure 9A:
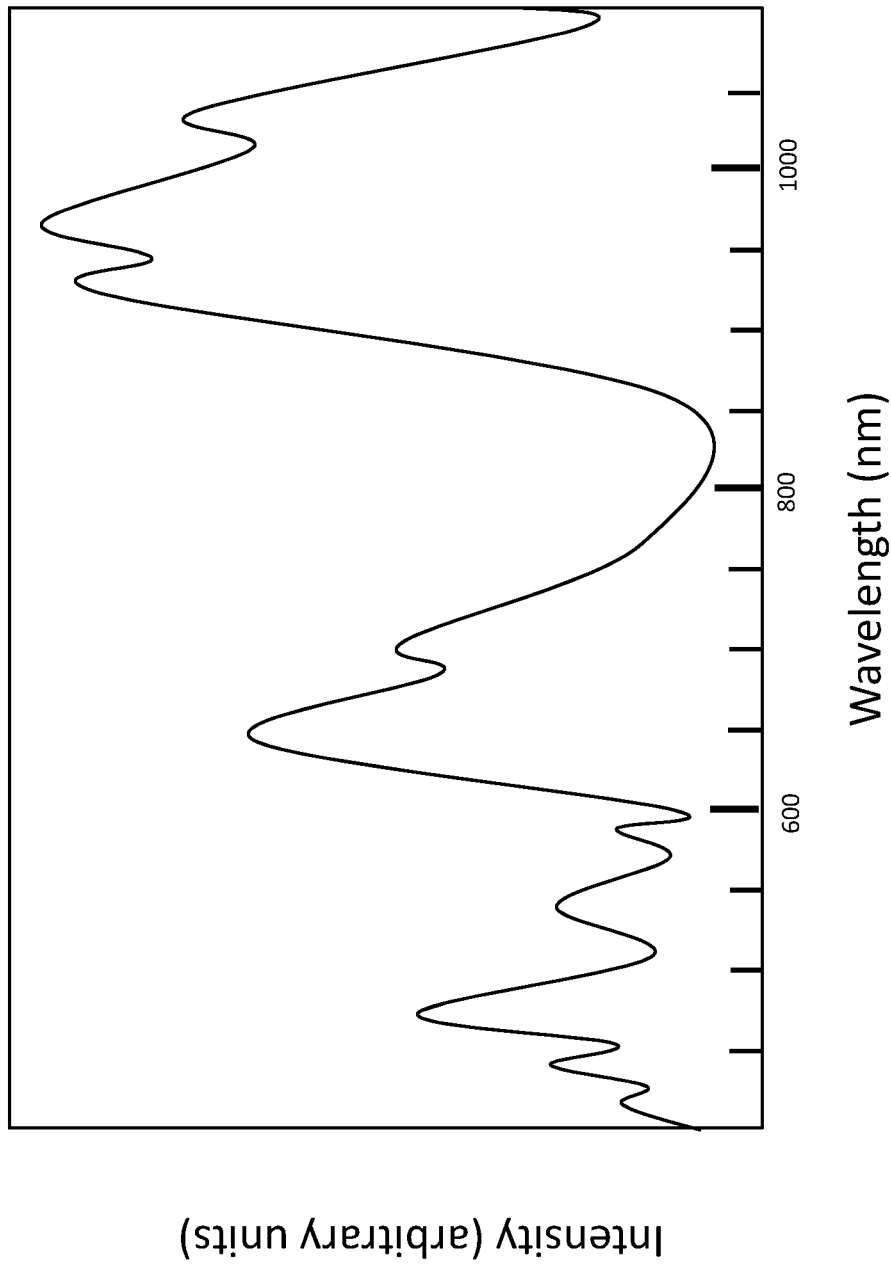
FIG. 9a schematically illustrates a luminescent spectrum emitted by a luminescent compound, wherein intensity is plotted as a function of wavelength.
Figure 9B:
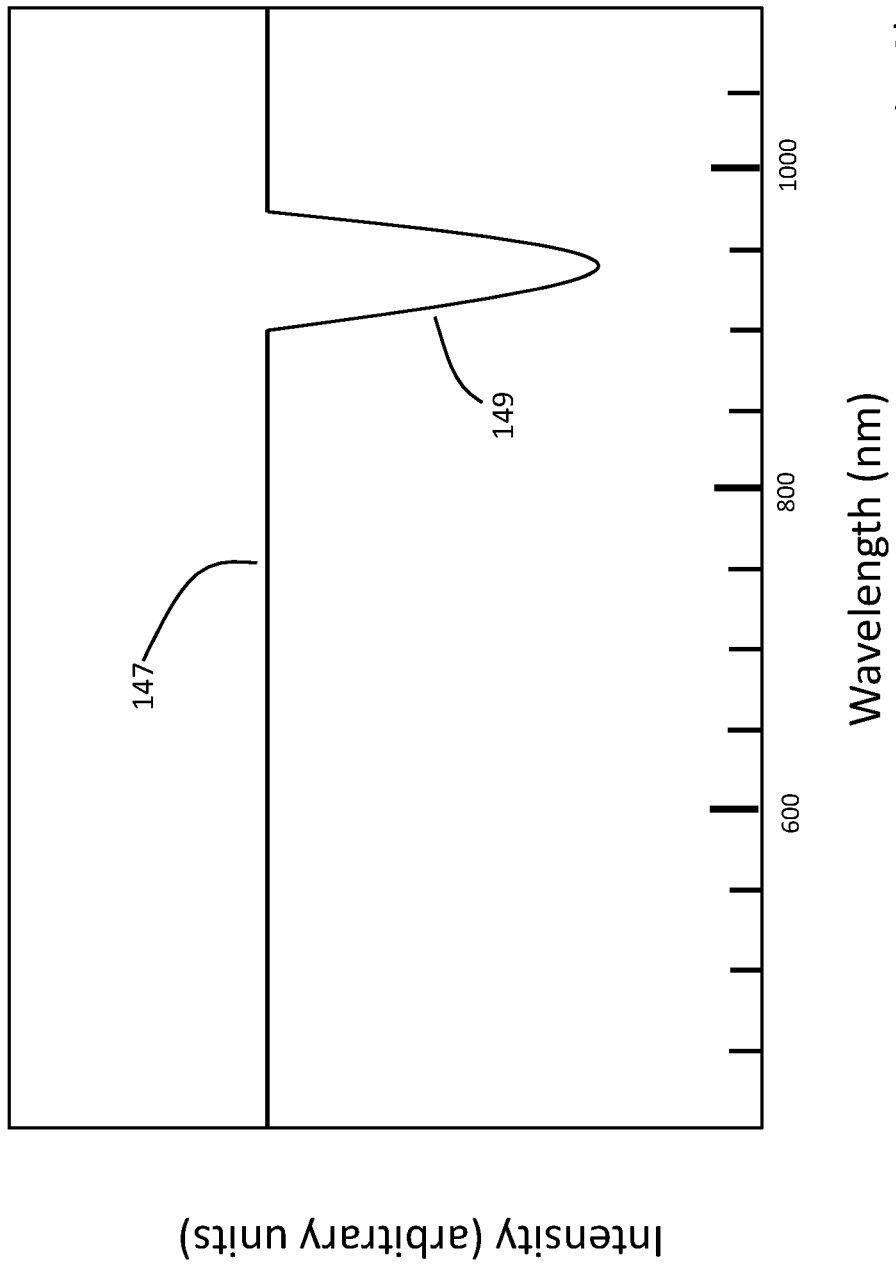
FIG. 9b schematically illustrates how the presence of an infrared absorber compound reduces the intensity of light reflected from a pod lid in an infrared bandwidth of the spectrum.

The impact of an IR absorbing compound 115 upon reflectance intensity is shown FIG. 9b. FIG. 9b shows a curve 147 of the intensity of reflected light as a function of wavelength. Curve 147 includes depression 149 in an infrared bandwidth portion. Depression 149 is a result of one or more infrared absorbing compounds absorbing incident illumination in this bandwidth portion to reduce the intensity of the reflected light in the region. In the absence of such a compound, there would be no such attenuation of curve 147. This effect can be incorporated into a portion of a spectral signature that is based on the presence of the depression 149 or its absence. For example, a spectral signature may only be authentic if one of the signature criteria is that this depression 149 is present in detected spectral data. Or, an alternative code may require that the depression be absent if, for example, one or more other specific signature features are present.

Some commercially available coffee brewing machines use 940 nm to 960 nm LED (infrared) to determine the presence of a pod in a brewing chamber. Such machines have a further flaw in that the field of view of the corresponding detector is often too large in that it may include undue portions of the central area of the lid, which often includes color graphics, text, and the like. The detection area may be so big that the central colors influence the reflectance detection too much for the IR illumination and reflection to be useful for more than pod detection. The present invention expands the signature capabilities of the machine, while also expanding the role of such a detector, by incorporating infrared taggant compound 115 into a taggant system. Infrared absorbing compound 115 may alter the reflectance properties of incident infrared light depending on whether such a compound is present to absorb some of the incident illumination. In such a case, the absorption would reduce the intensity of the reflected light. Further, the detector used to detect the infrared (IR) reflectance may be fitted with a mask in order to restrict its field of view to be substantially only lid portions, e.g., a portion of ring 116, that may incorporate an IR absorbing compound used for signature encoding purposes.

Desirably, at least an additional portion of a spectral signature code is encoded in one or more portions of a luminescent spectrum of at least one additional luminescent taggant compound 106. For example, such signature features may be encoded in one or more portions of the corresponding luminescent spectrum in wavelengths such as those in the range from 400 nm to 1200 nm, sometimes even from 550 nm to 1200 nm. Encoding may occur in higher or lower wavelengths, if desired. Optionally, at least an additional portion of a spectral signature code is encoded in one or more portions of an additional luminescent spectrum of a further additional luminescent compound 110, or even luminescent spectra of even more additional luminescent compounds including but not limited to compounds 106 and 110. As is the case with compound 106, signature features may be encoded in the spectra of compound 110 and/or other luminescent taggant compounds at one or more wavelengths in the range 400 nm to 1200 nm, or even 550 nm to 1200 nm. As was the case with compound 106, encoding may occur in higher or lower wavelengths as well.

The taggant compounds 106, 110, 114, and 115 may be incorporated onto pod 14 in a variety of different ways in one or more locations. In an illustrative mode of practice as shown in FIGS. 4 and 6, the luminescent taggant system includes as one component a spectral signature ring 116 provided around the perimeter of lid 80. In contrast to the image 120 that encodes data in a visual pattern that can be read via scanning or image capture of the pattern, spectral signature ring 116 is read by provoking spectral responses from the taggant compound(s) incorporated into ring 116. Such responses may be luminescent in the case of compounds 106 and 110, or may be reflectance-based in case of an IR absorbing compound. The spectral responses then are detected with suitable detector(s). Taggant compounds that exhibit luminescent responses to suitable illumination are referred to herein as luminescent taggants or luminescent taggant compounds. In the meantime, the illustrated embodiment shows the compound 114 (comprising one or more optical brightener compounds) being incorporated into the topcoat layer 112. As an option, compounds 106, 110, 114 or 115 may be incorporated into other locations on pod 12.

The spectral response of a particular luminescent taggant (e.g., compounds 106, 110, and in some embodiments all or a portion of compound 114) incorporated into the signature ring 116 refers to the luminescent response, e.g., intensity, as a function of wavelength (or frequency) over a suitable wavelength (or frequency) range. The response also may be referred to in the spectroscopy field as the emission spectrum or the optical spectrum. The spectral response may be presented in a form of a diagram in which a characteristic of the response, such as power or intensity, is plotted as a function of the wavelength (or frequency). Often, this process occurs by illuminating a portion of the ring 116 with suitable light illumination (e.g., suitable wavelength and intensity characteristics to cause a luminescent response). A detector is positioned to capture the luminescent emissions from that portion in order to harvest the spectral information. Control system 20 may then use the spectral information to confirm if desired spectral features indicative of a particular spectral signature are present. Because some spectral signatures may be very difficult to reverse engineer, spectral signatures may be used to authenticate the source or identity of pod 12 such as to authenticate a barcode incorporated onto pod 12. Spectral signatures are useful for authentication, because other features on pod 12, such as a barcode, a graphic image, or text information, are easier to copy without proper authorization.

In one embodiment, control system 20 desirably includes programming instructions that evaluate information comprising encoded, machine readable image data obtained from the bar code image and spectral data emitted by the substrate in response to illumination by an LED illumination system to determine information indicative of whether the substrate comprises said taggant system. In another embodiment, control system 20 comprises program instructions that evaluate information comprising spectral data emitted by the substrate to determine information indicative of whether the substrate comprises said taggant system encoding the spectral signature. In another embodiment, control system 20 comprises program instructions that evaluate information comprising spectral data emitted by the substrate in response to illumination by the first LED illumination source and at least one of the ultraviolet and/or violet LED illumination source and/or the infrared LED illumination source to determine information indicative of whether the substrate comprises said taggant system encoding the spectral signature.

For purposes of illustration, FIG. 9a, shows a spectral response associated with an exemplary luminescent taggant compound. The intensity of the spectral emissions of a luminescent compound are plotted as a function of wavelength. At each wavelength, the height of the curve indicates the intensity of detected light at that wavelength. Just as a fingerprint or signature of a person can be used to confirm the identity of that person, different luminescent taggant compounds exhibit spectral curves that are unique relative to the spectral responses of other luminescent taggant compounds. A spectral signature desirably may result from a composite of features of multiple spectra whose characteristics are impacted by factors including the kinds of taggant compounds, the ratios of the taggant compounds, how the compounds are incorporated into inks, how the inks are printed, how the printed lids are affixed to the pods 12, and the like. The unique character of a resultant spectral signature means that a spectral signature can serve as a fingerprint to help identify or authenticate a particular substrate. A typical spectral signature resulting from composite characteristics of multiple spectra dependent on so many factors. A composite signature, therefore, is more complex and more unique to make it easier to distinguish, harder to reverse engineer, able to encode more information, and/or the like. Consequently, one or more spectral responses of one or more corresponding taggants can be integrated to provide a composite spectral signature that can be used to help identify or authenticate lid 80. For purposes of illustration, embodiments of composite spectral signatures are derived from the spectral responses of two luminescent taggants 106 and 110, luminescent optical brightener 114, and reflectance-modulating characteristics of infrared absorbing compound 115.

The signature code provided by using a combination of compounds 106, 110, 114, and 115 may be part of a library of different spectral signature codes that can be associated with different pods 12 or groups of pods 12 (e.g., a group could be a particular type of beverage or a particular brand, or the like). In some embodiments of a code in the library, only one of compounds 106 or 110 is used, and only one of compounds 114 and 115 is used. In some embodiments of a code in the library, both compounds 106 and 114 are used, while only one of compounds 114 and 115 is used. In some embodiments of a code in the library, only compounds 106 and/or 110 is/are present in a particular signature code. In some embodiments of a code in the library, only compounds 114 and/or 115 is/are present in a particular signature code.

In one mode of practice, the spectral signature portions incorporated into spectral signature ring 116 via taggant compounds 106, 110, and 115 are read when pod 12 is inserted into machine 18. Because pod 12 may be inserted into machine 18 with lid 80 rotated in a variety of different positions with respect to pod chamber axis 51 (See FIG. 2), and because only a relatively small portion of lid 80 is illuminated and read to detect the signature portions encoded in ring 116, spectral signature ring 116 has an annular shape. The annular shape allows signature information stored in ring 116 to be detected and then decoded regardless of the rotational orientation of pod 12 in machine 18 with respect to axis 51. No matter how the pod 12 is rotationally oriented with respect to axis 51 when properly inserted into pod chamber 50 of machine 18, a portion of the annular ring 116 will be in a position to be properly illuminated by a suitable light source and read by a suitable detector. In other words, the annular shape makes spectral signature ring 116 rotationally symmetric for illumination and reading with respect to axis 51.

If ring 116 were not annular, and thereby not rotationally symmetric in this way, it could be a risk that the signature might not be present in the portion of lid 80 in the field of view of the detector. Note, too, that the spectral signature features incorporated into ring 116 are the same regardless of the rotational orientation of lid 80 when a portion of the ring 116 is illuminated and read. Ring 116, therefore, also is readable independent of the orientation of pod 12 with respect to axis 51. In other words, many typical taggant detectors only have a field of view that encompasses a relatively small area. In such a case, it is advantageous to focus a detector onto a region proximal to the outer rim of a pod 12. The taggants 106 and 110 are incorporated into ring 116 so that the detector's field of view includes a portion of ring 116 no matter how pod 12 is rotationally oriented under the detector.

In contrast, image 120 need not be rotationally symmetric in the same manner, because the algorithms that decode the encoded image information also can determine and account for the orientation of image 120 as captured in order to properly decode the encoded information.

The performance of a spectral detector configured to read ring 116 can be improved by fitting a mask over the detector to restrict the field of view to encompass substantially only the underlying portion of ring 116 while excluding other portions of lid 80 from the field of view. This helps to prevent other lid features, such as colors from other indicia printed on lid 80, from influencing the signature aspects being read. Such a mask also cuts down stray light from influencing the detector operation as the signature is read. Such a mask is particularly beneficial when a detector monitors the presence of an infrared absorbing compound, because reflectance readings used to detect reflectance attenuation caused by the infrared absorbing compound may be compromised if the field of view is too large such as to encompass too many colors on lid 80 outside of ring 116.

As shown in FIG. 6, the taggant system includes some taggant constituents deployed in signature ring 116. These include at least the luminescent taggant compounds 106, 110, and the infrared absorbing compound 115 incorporated into at least one printed ink layer 118 incorporated into ring 116. As an option, some or all of the compounds 106, 110, and 115 can be incorporated into different printed layers of ring 116 if desired as shown in FIG. 7. Lid 80 of FIG. 7 incorporates compounds 106, 110, and 115 into printed ink layers 121 and 123 rather than into a single layer 118 as shown in FIG. 6. The luminescent taggant system also includes at least one of optical brightener compound 114 deployed in topcoat layer 112 in the illustrated embodiments of FIGS. 6 and 7. Some infrared absorbing compounds may have a visually observable color. Hence, it may be desirable for aesthetic reasons to incorporate compound 115 into ring 116 as shown rather than top coat 112 so that the top coat color is not unduly altered in the central area inside ring 116.

The spectral responses of taggant compounds 106, 110, 114, and 115 may be read in many ways. According to an illustrative two stage strategy, a first stage involves illuminating all or a portion of lid 80 with and illumination that includes ultraviolet and/or violet wavelengths. An ultraviolet and/or violet LED illumination source is particularly preferred. This triggers luminescent responses in compounds 106, 110, and 114. A suitable detector may read all three triggered responses at the same time. In a second stage, all or a portion of lid 80 is illuminated with an illumination source including infrared wavelengths. This may be the same illumination source as used with respect to compounds 105, 110, and 114 if the source includes the ultraviolet/violet and infrared wavelengths. This can also be a separate illumination source such as an infrared LED illumination source. A detector reads the reflected infrared light in order to detect whether intensity attenuation in the infrared portion of the reflectance spectrum indicates the presence of compound 115.

For example, referring to FIGS. 1-3, 6 and 7, each of luminescent compounds 106, 110, and 114 independently emits a luminescent spectral response to an illumination by a preferred LED illumination system incorporated into sensor system 42 (described further below). The LED illumination system generally includes at least one ultraviolet and/or violet LED illumination source 134 effective to trigger luminescent responses from luminescent taggant compounds 106, 110, and 114. More than one LED illumination source could be used with respect to compounds 106, 110, and 114, such as might be desirable if the responses of compounds 106, 110, and 114 were to be read in more than one detection event. In an illustrative embodiment, an LED illumination source 134 has an illumination peak in the range from 200 nm to 420 nm, preferably 350 nm to 420 nm, wherein the main illumination peak has a wavelength bandwidth in the range from 20 nm to 150 nm in many embodiments. In an embodiment, the LED illumination source 134 has an illumination peak that is centered on a wavelength in the range from 380 nm to 390 nm.

Referring again mainly to FIGS. 6 and 7, topcoat layer 112 of lid 80 generally provides a protective, slip (non-stick), optically transparent coating over the underlying layers of lid 80. Topcoat layer 112 typically covers substantially all of the underlying layers of lid 80, which is the embodiment illustrated in FIG. 6. In the printing industry, topcoat layer 112 sometimes may be referred to as an overprint varnish layer. Layer 112 can be provided with a matte, satin, or glossy finish, as desired. Additionally, layer 112 can be optically clear or tinted, but desirably is optically clear to avoid adversely impacting both the visual appearance of indicia 119 as well as the triggering and detection of the spectral signature features incorporated into lid 80. Suitable topcoat materials are generally viewed as colorless inks but in practice may have pale colors such as a pale amber color.

As used herein, optically transparent means that the layer 112 is sufficiently light transmissive to allow the one or more LED illumination sources to illuminate the compounds 106, 110, 114, and 115 in a manner effective to trigger corresponding spectral responses and to allow the spectral responses to reach and be detected by one or more suitable detectors. The material(s) used to form layer 112 will be deemed to be optically transparent if the top coat printed using a 13.5 BCM (billion cubic microns per square inch) anilox roller in conjunction with a 55 durometer rubber transfer roller on a Harper QD drawdown table at speed 8 does not change the signature intensity at wavelength 610 nm by more than 70% (which may be an increase or decrease) of the absolute relative intensity, preferably no more than 50% as compared to an identical sample that does not include topcoat when using a Stellarnet Black Comet brand spectrometer-50 nm slit width and interrogating the sample with a reverse reflectance probe in contact with the sample at 45 degrees under LED illumination having a peak whose maximum is in the range from 300 nm to 400.

Examples of coatings suitable to form topcoat layer 112 are commercially available from a variety of commercial sources. Examples of such commercially available materials include, for example a coating available as RAW 13118-650 from the Flint Group; coating available as 91570180-CHAFS0032183 VALOPTEMP OPV from Sun Chemical; a coating available as UV-PureRad 53905D from Ashland; and coatings available as WB-KS-9018, UV-KS-810, or UV-KS529 from Kustom Services (also the Kustom Group).

One advantage of the present invention is to incorporate additional or alternative LED illumination capabilities in the ultraviolet or violet range(s) and/or infrared ranges into system 10 that allows taggant compound 114 and/or 115 to contribute spectral signature functionality rather than merely only optical brightening functionality. The result is that overall signature features may be derived from not only compounds 106 and/or 110 but also or alternatively compounds 114 and/or 115 as well. The present invention allows signature ring 116 and topcoat layer 112 to provide more complex signatures that can encode more complex, more secure, and/or a greater number of individual codes as compared to a spectral signature system based on just compounds 106 and 110 alone.

FIG. 2 schematically shows more details about sensor system 42. Sensor system 42 in one aspect includes features that allow image capture of information from lid 80. In this regard, sensor system 42 includes at least one imaging device 130 configured and deployed in a manner effective to capture image(s) of lid 80. Sensor system 42 also includes features that illuminate lid 80 with LED illumination from one or more illumination sources such as ultraviolet and/or violet LED illumination source 134 in order to trigger one or more of taggant compounds, 106, 110, 114, and/or 115, as present, to emit spectral responses. In one exemplary embodiment, sensor system 42 includes LED illumination source 134 that emits LED illumination in an ultraviolet bandwidth (such as, for example, an ultraviolet bandwidth having a peak centered at about 380 nm to 390 nm and a peak bandwidth in the range from 20 nm to 200 nm, preferably 50 nm to 150 nm).

Sensor system 42 also includes an LED illumination source 136 that emits infrared LED illumination. One suitable embodiment of source 136 would have a peak centered about a wavelength in the range from 700 nm to 1000 nm and a peak bandwidth in the range from 20 nm to 200 nm, preferably 50 nm to 150 nm.

Sensor system 42 further includes at least one detector 138 aimed at the spectral signature ring 116 and topcoat layer 112 in a manner effective to detect the responses of taggant compounds that may be present on lid 80. For purposes of illustration, sensor system 42 includes detector 138 configured to detect spectral data for compound 114 in a wavelength range including from 400 nm to 550 nm. Detector 138 optionally may be fitted with optical filter 140 to block light with a wavelength below about 400 nm from reaching detector 138. In some embodiments, the detector 138, filter 140, and illumination source 134 are used with respect to detecting spectral responses of all of compounds 106, 110, and 114 at the same time. Alternatively, the detector 138, filter 140, and illumination source 134 are used with respect to detecting spectral response only for compound 114, and sensor system 42 includes an additional detector (not shown) optionally fitted with an optical filter (not shown) to detect spectral data for compounds 106 and 110 under illumination from source 136. The spectral response associated with the compound 115 may be detected under infrared LED illumination source 136 using the same detector 138 or a different detector. In order to more accurately detect a spectral response of compound 115, detector 138 may be fitted with mask 141 in order to restrict the field of view of detector 138 to exclude viewing regions of lid 80 in which compound 115 is not deployed.

Control system 20 is configured to actuate LED illumination source 134 to trigger taggants 106, 110, and 114 to emit luminescent emissions and then to capture resultant spectral data for compound 114 if present using detector 138. Control system 20 also is configured to actuate infrared LED illumination source 136 to and then to use detector 138 to read if compound 115 is present to attenuate reflectance intensity in one or more IR bandwidth portions.

LED illumination sources 134 and/or 136 or a different illumination source may be used to help provide illumination for image capture by imaging device 130. For purposes of illustration, one or both of the LED illumination sources 134 and 136 may be used to illuminate lid 80 during image capture. As an alternative, additional lighting elements 148 may be incorporated into sensor system 42 in order to illuminate the field of view of the imaging device 130 when activated to capture image information. As shown, sensor system 42 includes first and second lighting elements 148. In other embodiments, only one additional lighting element 148 is used. In other embodiments, three or more of such lighting elements 148 may be used.

As an option, sensor system 42 may be fitted with one or more additional sensors 146. Sensors 146 may be used to sense one or more characteristics of pod 12 or pod chamber 50. For example, sensor 146 may be configured to detect the presence of pod 12 in chamber 50. Sensor 146 may detect when cover 44 and chamber 50 are closed. Sensor may detect preparation conditions such as temperature of water or liquid used in a preparation. Data harvested by sensor system 146 may be transmitted to control system 20 by a suitable communication pathway 128.

FIGS. 1-3 show additional features of machine 18. Machine 18 includes hinged cover 44 that may be opened or closed. Cover 44 included handle 46 to allow easy actuation by a user. A pod station 40 including a pod holder 48 is accessible when cover 44 is open. Pod station 40 is closed when cover 44 is closed. Pod holder 48 houses pod chamber 50. When cover 44 is open, pod 12 may be placed into or taken from the chamber 50. Cover 44 can be closed to isolate preparation station 40 from the ambient. This also causes chamber 50 to be sealed by chamber lid 52. Cover 44 can be closed to initiate data functions, to carry out preparation functions, and/or to store machine 18 when machine 18 is not in use. If a pod 12 is positioned in chamber 50 when cover 44 is closed, this may trigger preparation and/or data gathering functions.

Sensor system 42 may be incorporated into chamber lid 52. This allows sensor system 42 to detect encoded image information and spectral signature information when pod 12 is sealed inside chamber 50 inside pod holder 48 and lid 52. As described further below, inlet and outlet functionality is integrated into pod holder 48 and lid 52 in order to carry out preparation of food or beverages. For example, one or more supply lines 54 and 58 forming a supply pathway 17 (see FIG. 3) may feed liquid precursor 16 from the tank 26 into pod 12 held in chamber 50. Also, one or more outlet lines 74 (see FIGS. 1 and 3) may feed a brewed food or beverage item 34 from pod 12 held in chamber 50 to container 28 held on pad 30.

FIG. 3 schematically shows a block diagram of further details of machine 18 and its integration with control system 20. Those of skill in the art will appreciate system 10 may be configured in a variety of different ways, and thus aspects of the invention should not be narrowly interpreted as relating only to one type of beverage forming apparatus.

Water or other liquid in the fluid supply from refillable storage tank 26 may be provided via a supply conduit 54 to a pump 56 (such as a centrifugal pump, piston pump, solenoid pump, diaphragm pump, etc.), which pumps the liquid via a pump conduit 58 to a heating tank 60 including heat element 62. Operation of the pump 56 and other components of the system 10 may be controlled by a control system 20, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The communication pathways 22 between controller and the various components of machine 18 include wired or wireless communication lines 66a, 66b, 66c, 66d, 66e, 66f, and 66g.

The heating tank 60 may be filled with a desired amount of liquid by any suitable technique, such as by running the pump 56 for a predetermined time, sensing a water level in the heating tank 60 using a conductive probe sensor or capacitive sensor, detecting a pressure rise in heating tank 60 when the liquid fills the tank, or using any other viable technique. For example, the control system 20 may determine that the heating tank 60 is appropriately filled when a pressure sensor detects a certain rise in pressure indicating that the water has reached a desired level in the heating tank 60. Alternately, the control system 20 may not determine whether the tank 60 is filled to a certain degree or not, and simply may assume that the tank 60 is filled appropriately once a first fill operation is completed.

Water or other liquid in the tank may be heated, if desired, by way of a heating element 62 whose operation is controlled by the control system 20 using input from a temperature sensor or other suitable input. Heated water or other liquid in the heating tank 60 may be dispensed via a heating tank conduit 64 to the pod chamber 50 in preparation station 40, where pod 12 is held. As one option, liquid may be discharged from the heating tank 60 by pressurizing the heating tank with pressurized air provided through line 65 by an air pump 66 that causes the liquid to be discharged through conduit 64. Completion of the dispensing from the heating tank 60 may be detected in any suitable way, such as by detecting a pressure drop in the heating tank 60, by detecting a water level change in the heating tank 60, use of a flow meter, or using any other viable technique.

Liquid alternatively may be discharged from the refillable storage tank 26 into a full heating tank 60 by the pump 56 operating to force a fixed volume or additional liquid into the tank 60 via conduit 58, thereby displacing a similar volume of water out of the tank 60 and to the brew chamber via conduit 64. A flow sensor 70 or other suitable device may be used to determine the amount of liquid delivered to the tank 60, and thus the amount of liquid delivered to the pod 12 in chamber 50. Alternately, the pump 56 may be a piston-type, diaphragm-type or other pump arranged such that a known volume of liquid may be delivered from the pump 56 to the tank 60 per cycle or per unit time, thus causing the same known volume to be delivered to the pod 12 in chamber 50.

FIG. 3 shows how the conduit 64 serves as a supply line to provide liquid to pod 12 in order to carry out the preparation of the desired food or beverage. The end of conduit 64 is fitted with a piercing element 72 to puncture pod 12 and deliver liquid inside pod 12. Outlet line 74 also is fitted with a piercing element 76 to allow the resultant food or beverage item to be delivered to container 28. Closing cover 44 causes the piercing elements 72 and 76 to pierce pod 12 in the desired manner as shown in FIG. 3.

Once pod 12 is located in the pod chamber 50 in the closed position, control system 20 may direct the system 10 to use the pod 12 to form a beverage or food item. Additionally, control system 20 may harvest and use data associated with the pod 12 and its use. With respect to data harvesting and use, control system 20 may cause sensor system 42 to detect information on the pod 12 such as information encoded in one or more images on the pod 12, spectral information encoded in the pod 12, images or textual information on the pod, and the like. The decoded information may include information to identify information associated with the pod 12, such as the commercial source of the pod 12, the type of pod 12, the ingredients in the pod 12, authentication information to help confirm the authenticity of the pod 12, and the like.

Control system 20 may use various strategies to detect and decode the pod information. For example, bar code information, text information, and images can be captured using image capture sensor(s). Bar codes can be decoded using a corresponding decoding algorithm. Text characters can be identified using optical character recognition (OCR). Edge recognition or pattern recognition techniques, imaging techniques, or the like, can be used to identify graphic images. Spectral signatures may be detected by illuminating the pod 12 with a suitable illumination in order to trigger a suitable luminescent response in taggants whose luminescence encodes signature features. An advantage of the present invention (discussed further below) over conventional brewers is to encode spectral signature components into at least one optical brightener compound 114 and/or IR absorbing compound 115 on pod 12. Machine 18 is configured in accordance with principles of the present invention in order to be able to detect those signature features. Conventional machines use inappropriate illumination and inappropriate optical filter elements that make it practically impossible to detect spectral signature features in the blue light regime, yet it is this blue light regime that is where significant spectral signature features may be encoded in the luminescent spectra of optical brightener compounds and even other taggant compounds. An aspect of the present invention is to make the blue light regime accessible for signature encoding.

The spectral responses of the pod 12, which are encoded in one or more taggants 106, 110, 114, and 115, can be detected by one or more suitable detectors 138 and decoded to confirm if certain spectral signature features are present. Additionally, detector 138 can be used to help determine the reflectance resulting when compound 115 is illuminated with infrared LED source 136. Once the information is harvested from pod 12, control system 20 can use the information in various ways. For example, control system 20 can use the information in a spectral signature to authenticate the pod 12 or to trigger preparation operations such as to select an appropriate recipe and then to cause machine 18 to carry out the recipe. Control system 20 may use other harvested information from barcodes, text, and/or images to trigger preparation operations as well.

Additionally, control system 20 may have remote server component(s) 150. Information about the pod 12, the machine 18 being used, the user, time and date of pod use, recipe conditions, or the like may be transmitted to a remote server component 150. An administrative entity or other entity may use the data or help others to use the data for marketing purposes such as to enhance the machine use experienced by the user, or to monitor product use and demand, to tailor marketing efforts to consumer use and demand, to determine the effectiveness of marketing strategies, to adjust marketing strategies, to maintain or service or update machine 18 features such as by software updates, and the like.

In addition to data harvesting and use, control system 20 may direct food or beverage preparation. Using harvested data, control system 20 selects a suitable preparation recipe from a library of recipes stored in a memory in system 10. Such recipes may be stored within components of control system 20 onboard machine 18. Alternatively, recipes may be stored in and accessed from a remote server component 150 of control system 20.

System 10 can carry out many different recipe strategies. For example, to brew a hot beverage such as tea, coffee, hot cocoa, or hot cider, control system 20 causes pump 56 to pump a suitable amount of liquid from fluid supply 16 to the heater tank via conduit 58. Pump 56 then causes the heated liquid to be fed to the pod 12 via conduit 64. One or more inlet piercing elements 72 may pierce the pod 12 so as to allow heated water or other liquid to be injected into the pod 12 from conduit 64. The resultant interaction between the injected liquid and the ingredients in the pod 12 may form the desired beverage or food item 34. One or more outlet piercing elements 76 puncture or pierce the pod 12 at an outlet side to permit the formed beverage or food item 34 to exit the pod 12 through the outlet line 74. The beverage or food item 34 is collected in the container 28.

Figure 8:
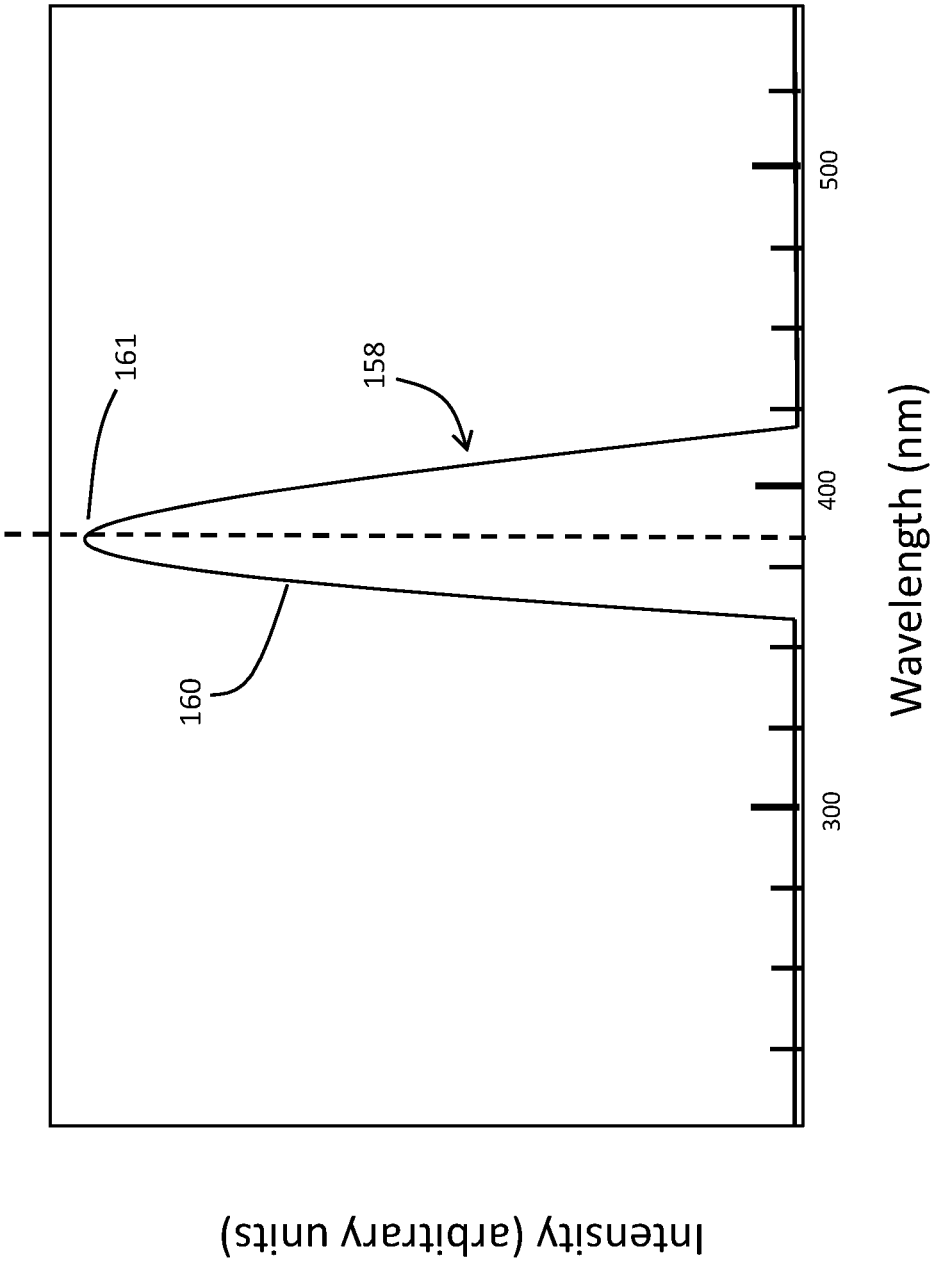
FIG. 8 schematically illustrates a typical spectrum of ultraviolet LED illumination, wherein intensity is plotted as a function of wavelength of the LED illumination.

FIG. 8 schematically shows an exemplary optical spectrum 158 for a typical LED illumination source. Spectrum 158 is plotted in the form of normalized intensity as a function of wavelength (nm). Spectrum 158 includes a single, main intensity peak 160 spanning a relatively narrow wavelength bandwidth (e.g., a peak that spans a wavelength bandwidth of about 70 nm to 150 nm) while other portions of the spectrum outside the single main peak 160 exhibit a substantially flat baseline of substantially 0 units of normalized intensity. The practical effect is that each LED source emits illumination within a relatively tight wavelength band, but emits substantially no illumination outside the band. Peak 160 has a peak maximum 161. Other spectra for other kinds of LED illumination sources would generally have a similar overall shape, but those would have single main spectral peaks, respectively, that are shifted on the wavelength axis relative to each other.

The narrow bandwidth associated with LED illumination is well-suited for use in triggering luminescent emissions of taggant compounds 106, 110, and 114 that can be detected by a suitable detector 138. Often, the luminescent response of a particular compound will include spectral components both that overlap the narrow main spectral peak of the LED illumination as well as additional spectral components that are outside the LED main spectral peak. The additional portions of the spectrum outside the main spectral peak of the LED illumination are easily detected without undue interference from the narrow LED spectrum.

In contrast, if broader illumination were used to trigger a luminescent response, the illumination could illuminate the detector with too much light intensity to allow accurately reading the signature spectra of interest. Hence, a spectral signature detector may be fitted with an optical filter in order to block wavelengths associated with the LED illumination. For example, a spectral detector may be fitted with an optical filter that blocks wavelengths under 400 nm when an LED illumination source with a main spectral peak including 385 nm is used. As another example, a spectral detector may be fitted with an optical filter that blocks wavelengths under 550 nm when an LED illumination source with a main spectral peak including 458 nm is used.

In the practice of the present invention, taggant compound 114 is desirably an optical brightener compound that emits a luminescent spectrum in which spectral signature features are desirably derived at least from the blue light regime of the spectrum. Conventional single serve, brewing machines such as those available under brand indicia including the trade designation KEURIG include an optical filter that blocks detection of wavelengths below 550 nm and therefore prevents deriving signature features from the blue light regime. Accordingly, a strategy of the present invention is to illuminate the compound 114 with ultraviolet light so that the blue light can be easily detected without undue interference from the ultraviolet illumination. Further, the detector used to detect the blue light response may be fitted with an optical filter blocking ultraviolet an even violet wavelengths, but not blue wavelengths. The same LED illumination source, optical filter, and detector can be used to detect spectra of the taggant compounds 106, 110, and 114 at the same time, if desired. Alternatively, if spectral signature features for compounds 106 and/or 110 are derived from longer wavelengths than the blue light regime, then a different LED illumination source, a different detector and optionally a different optical filter associated with such different detector may be used to detect the spectral response of compounds 106 and/or 110.

Luminescent compounds suitable for use as compounds 106, 110, and 114 generally absorb incident light of suitable wavelength characteristics, experience photoexcitation, and then re-emit light as the excitation dissipates. Hence, luminescent light emission is different from incident light that is merely reflected or transmitted. Often, a luminescent compound absorbs light of certain wavelength(s) and re-emits light of a longer wavelength. Some luminescent compounds may absorb light of certain wavelength(s) and re-emit light of a shorter wavelength, however.

Luminescent compounds include phosphors (up and/or down converting), fluorescent compounds (sometimes referred to as fluorophores or fluorochromes) and/or phosphorescent compounds. Fluorescent compounds are preferred. Without wishing to be bound, it is believed that fluorescence results from an allowed radiative transition from a first excited singlet state. Without wishing to be bound, it is believed that phosphorescence results from an allowed radiative transition from a spin-forbidden transition from a first excited triplet state.

Luminescent compounds useful in the practice of the present invention for use as compounds 106, 110, and 114 may be inorganic or organic. Fluorescent compounds in the form of organic dyes are particularly preferred, as these tend to be more compatible with inkjet printing, gravure printing, screen printing, flexographic printing, curtain coating, spin coating, and the like. Hence, each of compounds 106, 110, and/or 114 may independently include at least one fluorescent compound and/or at least one phosphorescent compound, but preferably comprises a fluorescent compound, and more preferably comprises an organic fluorescent dye. Any two or more of compounds 106, 110 and/or 114 may interact according to fluorescence resonance energy transfer (FRET). FRET refers to a mechanism involving energy transfer between luminescent molecules. In practical effect, FRET occurs in a sequence where an illumination initially triggers a fluorescent emission by a first, or donor molecule. The fluorescent emissions of the donor molecule are effective to be absorbed and trigger a further fluorescent emission by a second, or acceptor fluorescent compound.

Examples of optical brightener compounds suitable for use as compound 114 are luminescent compounds that emit a luminescent response including blue light having at least one illumination peak in the range from 420 nm to 500 nm in response to ultraviolet or violet LED illumination having an illumination peak in the wavelength range from 200 nm to 420 nm. Compounds that luminescently emit blue light in response to ultraviolet or violet illumination are known in the industry as optical brighteners. An optical brightener according to conventional practice helps to make an item appear whiter and brighter.

In the practice of the present invention, ultraviolet light is light that has one or more wavelength peaks in the range from 100 nm to 400 nm. Violet light is light having one or more wavelength peaks in the range from greater than 400 nm to 450 nm. Blue light refers to light having one or more wavelength peaks in the range from greater than 450 nm to 500 nm. Infrared light is light having one or more wavelength peaks in the range from 700 nm to 1200 nm.

As between using LED illumination in the ultraviolet range or the violet range to trigger a fluorescent response in the taggant compound 114, ultraviolet light is preferred. The reason is that ultraviolet light has less potential to overlap and wash out the blue light fluorescently emitted by compound 114 as compared to using violet LED illumination. As a practical matter, this means that using an LED light source to trigger the luminescent signature response of compound 114 makes the emitted signature easier to detect and resolve without interference from the illuminating light. Ultraviolet (UV) light includes UV-C light having a wavelength in the range from 100 nm to 280 nm, UV-B light having a wavelength in the range from 280 nm to 315 nm, and UV-A light having a wavelength in the range from 315 nm to 400 nm. Ultraviolet LED illumination having an illumination peak in the UV-A band is presently preferred. One example of such LED illumination is an LED light source that provides an illumination peak at 385 nm.

In the field of single serve beverage machines, some prior art pods are available that include taggant rings as well as an optical brightener in an overcoat on the pod lid. However, the commercially available brewers used with these pods use blue LED illumination having a peak illumination at 458 nm. Under this illumination, the optical brightener helps to enhance visible print features, but the LED illumination interferes with any potential luminescent signature emitted from such an optical brightener in the blue light regime. Further, in order to prevent illumination interference between the illumination and the detected response, the spectral signature detector in the conventional brewers has been fitted with an optical filter that blocks wavelengths below 550 nm from reaching the detector. The filter might help to prevent such illumination interference, but it also prevents the detector from reading any spectral features of the optical brightener in the blue light regime from 450 nm to 500 nm.

The practice of the present invention appreciates that a spectral signature associated with the optical brightener can be detected and therefore used to encode signature features by using an LED illumination source whose wavelength illumination characteristics are distinct from those of the blue light luminescent emissions triggered by the illumination. In particular, the spectrum of ultraviolet or violet LED illumination used in the practice of the present invention is shifted away from the blue light and higher (if any) wavelength emissions of the optical brightener. Consequently, the spectral signature features of the optical brightener in the blue light regime can easily be detected while those of the LED illumination can be blocked from reaching the detector by an appropriate optical filter. In the cause of using ultraviolet LED illumination with a peak intensity at 385 nm, for example, the corresponding detector 138 may be fitted with an optical filter 140 over the detector(s) to block out at least a portion of the illumination wavelengths, e.g., wavelengths below about 400 nm, or even below about 430 nm, from reach reaching the detector(s).

The same illumination strategy can be used with respect to the taggant compounds 106 and 110. These, too, desirably are illuminated with LED illumination wavelengths that avoid overlap with the wavelength emissions that incorporate the desired spectral signature features. Depending on where the spectra of compounds 106 and 110 provide spectral signature features of interest, the signature responses of compounds 106 and 110 can be triggered with the same LED illumination source used to trigger the compound 114 signature features. Alternatively, different LED illumination can be used to trigger the compound 106 and 110 signatures. Suitable optical filters also may be used to block at least a portion of the LED illumination wavelengths from reaching the corresponding detector(s) used to read detect the spectral signature features of compounds 106 and 110.

Examples of fluorescent compounds suitable for use as compounds 106 and 110 are described in U.S. Pat. Nos. 8,034,436; 5,710,197; 4,005,111; 7,497,972; 5,674,622; and 3,904,642.

Examples of phosphorescent compounds for use as compounds 106 and 110 are described in U.S. Pat. Nos. 7,547,894; 6,375,864; 6,676,852; 4,089,995; and U.S. Pat. Pub. No. 2013/0153118.

Examples of compound 114 are described in U.S. Pat. Nos. 6,165,384; 8,828,271; 5,135,569; 9,162,513; and 6,632,783.

Examples of compound 115 are described in U.S. Pat. Nos. 6,492,093; 7,122,076; 5,380,695; and Korea patent documents KR101411063; and KR101038035.

Examples of up and down converting phosphors are described in U.S. Pat. Nos. 8,822,954; 6,861,012; 6,483,576; 6,813,011; 7,531,108; and 6,153,123.

FIG. 3 schematically shows features of system 10 to allow pod 12 to be used to brew a hot beverage in machine 18. When pod 12 is inserted into a brewing machine 18, piercing element 72 on conduit 64 punctures lid 80 and enters the pod chamber 84 through a corresponding top puncture hole. Also, outlet piercing element 76 on outlet conduit 74 punctures bottom 90 and enters a lower part of pod chamber 84 through a resultant bottom puncture hole. Heated liquid from line 64 is dispensed into chamber 84 through the lid 80. The heated liquid contacts the first beverage precursor 14 held in pod 12. For purposes of illustration, the beverage precursor 14 includes coffee grounds. Contact between the precursor 14 and heated liquid generates a brewed beverage 34, which would be a coffee beverage in this illustrative example. The brewed beverage passes through the filter 86, enters the outlet conduit 74, and then is conveyed by conduit 74 to be collected in a beverage container 28.

In some embodiments, the control system 20 may activate the imaging device 130 to capture image information according to a trigger mechanism. In some embodiments, the trigger mechanism will detect the closing of the pod chamber 50 and in response will instruct the imaging device 130 to capture one or more images of at least a portion of the lid 80. The trigger mechanism also may trigger data harvesting that involves both image capture and spectral signature detection. The spectral signature detection protocol may be used to determine if one or more particular spectral signatures are detected. The result of the protocol may include transmitting the data to a remote server component 150 of system 20 to decode the data and to determine what kind of spectral signature information is detected. This decoding alternatively may take place onboard machine 18. If certain spectral signature information is detected, this could be used to generate an authentication output indicative of a confirmation that the pod 12 is associated with a particular source. Authentication may be used to implement one or more brewer functions associated with the authentication or spectral signature decoding.

According to one aspect, system 10 is configured to transfer data harvested from pod 12 as well as corresponding machine, location, date and time, and/or user data to a remote server component 150 of control system 20. For example, as shown in FIG. 1, the control system 20 may transfer data to a remote server component 150 via a network communication line 25.

In some embodiments, the control system 20 is arranged to transmit the harvested data to the remote server component 150 before, during or after a food or beverage formation cycle has started or completed. The control system 20 also may be configured to store the harvested data in a memory of the machine 18 after completion of the food or beverage formation, and/or to transmit the data from the onboard memory to the remote server component 150 at a later time. For example, if the machine 18 does not have network connectivity (e.g., the Ethernet cable has been unplugged or the wireless connection has been interrupted) at the time of data harvesting, the control system 20 may instruct the onboard memory to store the data until the apparatus has reestablished network connectivity. That point the data would be transmitted to the remote server component 150, if desired. As will be appreciated, in some embodiments, the data in the onboard memory may be discarded by control system 20 in response to a triggering event, such as successful transmission to remote server component 150, a need to empty onboard memory to store new data, passage of a time period, or the like.

According to another aspect, system 10 is configured to capture and send food and beverage preparation parameters to the remote server component 150. In some embodiments, control system 20 is arranged to send both data harvested from pod 12 as well as food and beverage preparation parameters to the remote server component 150. As will be appreciated, in other embodiments, the control system 20 may be actuated to send only data harvested from pod 12 or only food and beverage preparation parameters to the remote server component 150.

In some embodiments, the additional food and beverage preparation parameters recorded by the control system 20 include one or more of the day of the week, the time of day, the size (e.g., volume) of beverage prepared, the geographic location of machine 18, the identity of the user, the source of the pod 12, the temperature of the water, the strength of beverage formed (e.g., strong, medium, weak), the type of beverage formed, and/or other apparatus settings (e.g., power settings, whether air was introduced into the precursor liquid during beverage formation, a carbonation level of the beverage, and the like). In some embodiments, the control system 20 is arranged to send the beverage preparation parameters to the remote server component 150 before, during, and/or after completion of beverage formation cycle.

According to still another aspect, the system 10 is arranged to transmit undecoded image and spectral data to the remote server component 150. Remote server component includes functionality or is connected with functionality that can decode the image data and the spectral data and store the decoded data in a remote, centralized database that stores data harvested from multiple machines 18 and pods 12. That is, in some embodiments the machine 18 does not itself decode the harvest image and spectral data. Rather, sensor system 42 simply captures the data, and then control system 20 sends the data to the remote server component 150 for processing.

In other embodiments, the machine 18 itself may include onboard components of control system 20 that may be configured to decode the image and/or spectral data obtained from pod 12. These onboard components also may include programming that causes selection of appropriate recipes as well as machine functions to prepare the desired food or beverage 34 item. As will be appreciated, in such embodiments, the machine 18 may include an image decoder (e.g., a barcode reader).

Turning back to FIG. 1, machine 18 and components of control system 20 incorporated onboard into machine 18 may have one-directional communication with the remote server component 150. That is, the machine 18 and its onboard control system components may communicate with the remote server component 150 but may not receive communications therefrom. In such an instance, the remote server component 150 may be arranged to send communications directly to a user (e.g., to a user's telephone or e-mail). In other embodiments, the machine 18 and its onboard control system components 23 may be arranged to have bidirectional communication with the remote server component 150 (e.g., sending communications to and receiving communications from the remote server component 150). For example, the remote server component 150 may send the user a message that is displayed on a user interface on the apparatus. In other embodiments, the remote server component 150 may send decoded data or instructions (e.g., a beverage preparation parameter or recipe) back to the apparatus 100, which may then use the decoded data or instructions to prepare the food or beverage item 34. Remote server component 150 also may determine authenticity of pod 12 installed in machine 18 using spectral data harvested from pod 12. If the spectral signature is authentic, corresponding brewer functions can be implemented for the pod 12.

In some embodiments, the user connects machine 18 to the remote aspects of control system 20, or consents to such connection, so that the machine 18 can transmit data to the remote aspects such as server component 150 and/or exchange communications with the remote server component 150. In one example, the user connects the machine 18 to the remote aspects by plugging an Ethernet cable into a port on the machine. In another example, the user connects the machine 18 to the remote aspects by enabling wireless connectivity. That is, the user may use a peripheral device (e.g., a smartphone, router, other connection, or the like). In such an embodiment, the user may use a smartphone application with instructions on how to configure the wireless connection and/or with software to load onto the machine 18. In other embodiments, the user enables wireless connectivity by simply pressing a button on the machine 18 and providing information effective to establish the connectivity.

According to some embodiments, the user may opt-in to allow the machine 18 to transmit and/or receive information, instructions, or other communications (e.g., the data harvested from the pod 12, authentication information and protocols, beverage preparation parameters, and/or the like) to the remote server component 150 via suitable network connectivity. In such embodiments, the user may opt in by downloading an application on his peripheral device (e.g., a smartphone application, internet-based application, etc.) and/or by filling out a form with his name, phone number, email address, when he purchased the apparatus, etc. in which case the vendor or another third party will help to set up the connectivity.

Figure 10A:
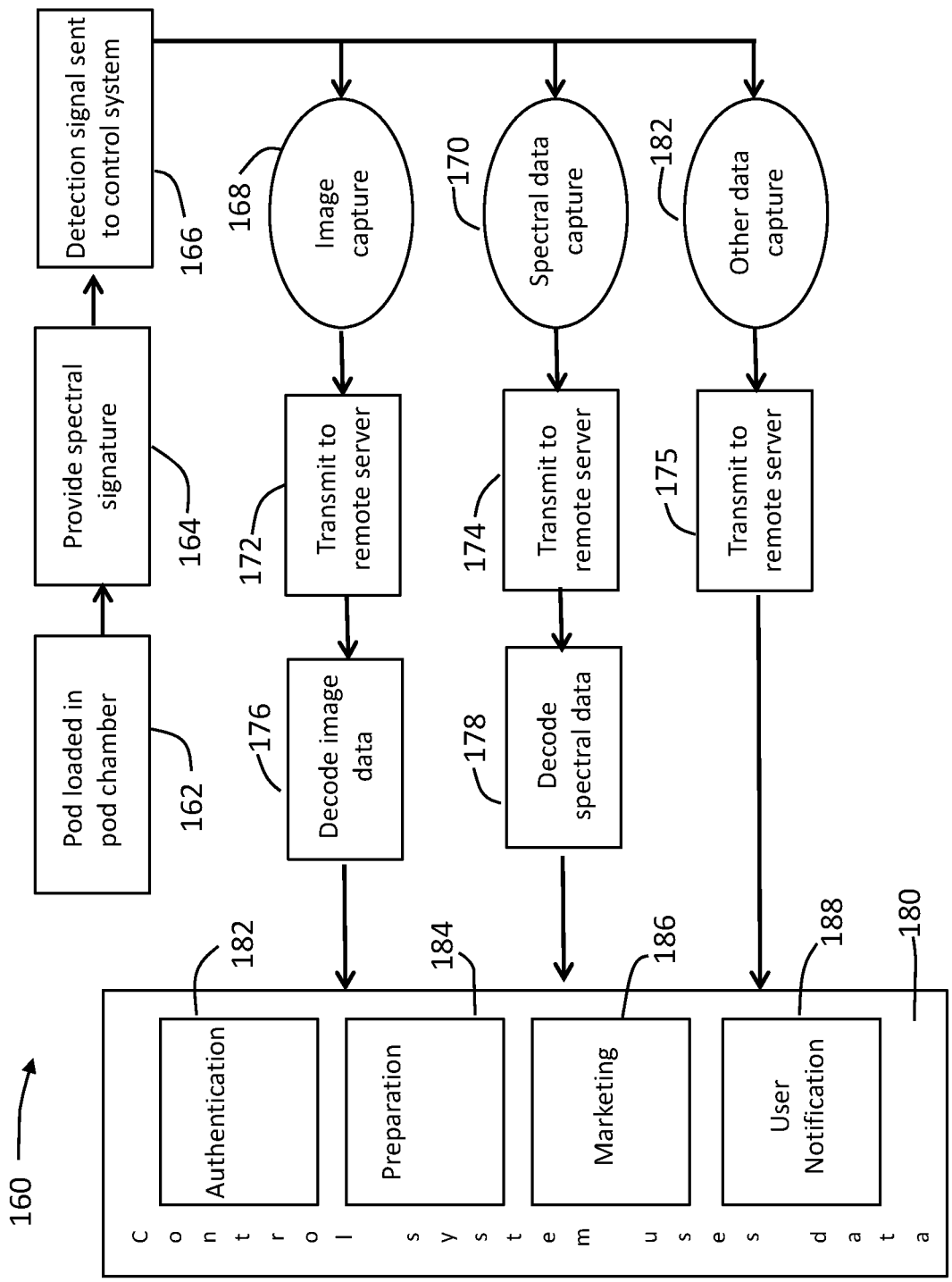
FIG. 10a schematically illustrates a block diagram of a method of the present invention for using the system of FIG. 1, wherein harvested data is transmitted to a remote server.

As shown in FIG. 10a, an illustrative method 160 of forming food or beverage item 34 is disclosed using system 10 of FIGS. 1 to 7. Method 160 is integrated with data harvesting and authentication protocols in accordance with the present invention. In particular, an aspect of method 160 involves using ultraviolet LED illumination source 134 and then using spectral detector 138 (optionally fitted with optical filter 140) to determine if a spectral response at least including signature features in the blue light regime indicates whether taggant compound 114 is present. The same or a different LED illumination source also may be used to determine if spectral data gathered by detectors 138 and/or 142 indicate if taggant compounds 106 and 110 are present. An advantage of the present invention is to use the ultraviolet LED illumination in order to detect spectral signature features of taggant compound 114, and optionally 106 and 110, in the blue light regime.

In the illustrated embodiment, method 160 includes receiving a consumable substance storage pod 12 in pod holder 48 and closing cover 44 in step 162. This also causes chamber lid 52 to close over pod holder 48 to form the enclosed pod chamber 50. Pod 12 comprises a consumable substance precursor 14 (e.g., coffee grounds, tea leaves and spices, hot cocoa powder, cider poser, etc.) stored in the pod 12. Lid 80 of pod 12 includes at least one image 120 provided on a surface of the lid 80, wherein the image includes encoded image data that is indicative of a characteristic of the consumable substance precursor 14 stored in the pod 12.

In step 164, a spectral signature is provided that is pre-associated with the consumable substance storage pod 12. At least a portion of the spectral signature is encoded in optical characteristics of at least one optical brightener compound 114 emitted in response to illumination with an ultraviolet and/or violet LED illumination source 134 and/or in optical characteristics of at least one infrared absorbing compound 115 emitted in response to illumination with an infrared LED illumination source 143.

In step 166, a suitable sensor 146 in sensor system 42 detects that pod 12 is present. A detection signal is sent to control system 20. In response to the detection signal, control system 20 will initiate data harvesting functions, authentication functions using spectral signature data, and/or food or beverage preparation functions in subsequent steps of method 160.

Method step 168 and step 170 involve data harvesting from lid 80. Method step 182 harvests other data from machine 18. Steps 168, 170, and 182 can be performed in any order or at least partially at the same time.

In step 168, control system 20 causes sensor system 42 to capture an image of pod lid 80. According to step 168, lid 80 of pod 12 is illuminated with one or more illumination sources incorporated into sensor system 42. Assisted by the illumination, imaging device(s) 130 capture an image of the lid 80.

In step 170, control system 20 causes sensor system 42 to capture spectral data (if any) emitted by pod 12 when illuminated with one or more LED illumination sources. Control system 20 can use the captured spectral data to determine if the composite spectral signature associated with taggant system derived from compounds 106, 110, 114 and 115 is present in the captured spectral data. If different LED illumination sources are used to detect spectra of taggant compounds 106 and 110 on the one hand, and taggant compound 114 on the other hand, the LED illumination sources and corresponding detection of spectral data can be accomplished sequentially in any order. If a common LED illumination source, e.g., LED illumination source 134, is used to trigger luminescent responses in all of taggant compounds 106, 100, and 114, then detectors 138 and/or 142 can read spectral data simultaneously. Simultaneous spectral data capture is particularly useful if signature features of each of the taggant compounds 106, 110, and 114 are derived from different bandwidth portions of the electromagnetic spectrum.

For example, first LED illumination source 134 can be actuated to illuminate the lid 80 of pod 12 with ultraviolet illumination having an illumination peak in the range from 300 nm to 420 nm. Spectral detector 138 associated with detecting spectral features of taggant compound 114 can read corresponding spectral data triggered by the illumination. Subsequently, second LED illumination source 136 can be actuated and spectral detector 142 associated with detecting spectral features of taggant compounds 106 and 110 can read corresponding spectral data in a different portion of the spectrum, e.g., 600 nm to 1200 nm, for example. In other modes of practice, LED illumination source 136 and detector 142 can be actuated first after which LED illumination source 134 and detector 138 can be actuated.

As described, a substantial amount of data can be harvested from lid 80 of pod 12 using imaging and spectral data analysis. In some embodiments, the method further includes step 182. Step 182 involves capturing additional preparation parameters (e.g., date, time, beverage size, user, geographic location, beverage preparation temperature, etc.) available from other components of system 10.

Steps 172, 174, and 175 involve transmitting harvested data to the remote server component 150. Steps 172, 174, and 175 may occur in any order or at least partially at the same time. In step 172, the captured image data is transmitted to the remote server component 150 and stored in a memory there. In step 174, the captured spectral data is transmitted to the remote server component 150 and stored in a memory there. Optionally, the resultant image data and spectral data may be stored in a memory onboard machine 18 in addition to or as an alternative to storage in the remote memory. The additional data captured in step 182 also may be transmitted to the remote server component 150. Control system 20 may cause the captured beverage preparation parameters to be stored in a centralized marketing database along with data harvested from lid 80.

Step 176 involves decoding the image data. For example, decoding may involve decoding one or more bar codes and/or translating images of text information using OCR techniques. The decoded image data can provide a wide variety of information about the nature of pod 12 as listed above. Decoding may occur in control system components located onboard machine 20. Alternatively, decoding may occur in remote control system components such as via a processor incorporated into remote server component 150.

Step 178 involves decoding the spectral data. Decoding may involve evaluating the spectral data to determine if the composite spectral signature code provided by taggant compounds 106, 110, 114, and 115 is present. Decoding may occur in control system components located onboard machine 20. Alternatively, decoding may occur in remote control system components such as via a processor incorporated into remote server component 150.

Control system 20 may use the decoded image data, spectral data, and/or other data in a variety of different ways in step 180. Exemplary uses include one or more of authentication in step 182, food or beverage preparation in step 184, marketing analysis in step 186, and/or user notifications in step 188.

For example, as one option, the decoded spectral and/or image information can be used for authentication in step 182 to confirm that pod 12 is supplied by a particular source. Authentication may involve determining if the spectral signature information resulting from ultraviolet LED illumination and optionally other LED illumination is indicative of fluorescent emissions that include spectral signature features associated with the proper presence of taggant compounds 106, 110, and 114. If the proper signature response of all three taggant compounds 106, 110, and 114 is detected, control system 20 can produce an authentication output to confirm that the pod 12 is authenticated as a pod 12 that is associated with a particular source.

An authentication output may authenticate a pod 12 as coming from a particular source only when the spectral data and the decoded image data match an authorized association of the two data types. For example, a particular spectral signature may be authentic only when appearing on a pod 12 whose image data encodes a particular brand and type of contents. If the brand and type of contents match the signature according to such a pre-determined association, the pod 12 may be deemed to be authentic relative to a particular source.

Alternatively, if the image data and the signature data do not match according to pre-determined authorized associations of the two data types, pod 12 would not be authenticated as coming from one of the pre-associated authentic sources. The lack of association, for example, could indicate that the pod 12 was a generic brand. Control system 20 can produce an authentication output to indicate that the spectral data does not include a proper spectral signature associated with one or more authentic commercial sources in the event that the proper signatures of the three taggant compounds 106, 110, and/or 114 is not detected. For a proper signature, all of the compounds 106, 110, and 114 are present in the right proportions. Control system 20 can store the authentication output in a centralized marketing database that collects authentication outputs from a plurality of systems 10 used by a plurality of users.

According to another option, in step 184 control system 20 can use the decoded image and/or spectral data in order to cause machine 18 to prepare a desired food or beverage item 34 from ingredients comprising the contents of pod 12 as a first consumable substance precursor and liquid from the fluid supply held in tank 26 as a second consumable substance precursor 16. To accomplish this, control system 20 can use decoded image data and/or decoded spectral data to select a corresponding recipe from a library of recipes stored in a memory. An appropriate control signal can be used to actuate machine 18 to carry out a preparation using the selected recipe. For example, different recipes can be used to adjust preparation parameters to brew tea versus coffee. Even among teas on the one hand, or coffees on the other hand, different process parameters can be used in different recipes in order to optimize brewing performance and/or to enhance the flavor of the resultant beverage item 34.

In step 184, control system 20 causes machine 18 to prepare a food or beverage using the selected recipe. In an illustrative preparation, an amount of liquid from fluid supply 24 is heated and dispensed into pod 12. The heated liquid interacts with the pod contents to provide a resultant food or beverage item 34. The food or beverage item is then dispensed from pod 12 into the container 28.

The data also can be used to support marketing efforts in step 186. For this purpose, the data can be accessed by one or more entities sources in order to learn information about consumer behavior that can assist in the analysis, planning and implementation of marketing and business plans for the development, manufacture, sale, and/or distribution of pods 12.

According to one aspect of marketing analysis, the control system 20 is configured to track the number of pods 12 consumed by users (e.g., the number of pods used and/or the types of pods used). In some embodiments, the remote server component 150 may track consumption by tracking the number of times a machine 18 sends data to the remote server component 150. That is, the remote server component 150 may tally the number of pods 12 that were imaged by the apparatus. In another embodiment, the remote server component 150 may track consumption by tallying the information extracted from the decoded indicia. That is, the remote server component 150 may count the number of each type of pod is used by the user. Artificial intelligence programming can be used to help undertake a marketing analysis from data harvested from a plurality of users.

According to another embodiment, the remote server component 150 is configured to determining a user's need for pod replenishment based on the user's consumption and on past purchase history. In some embodiments, the remote server component 150 determines when a user is in need of pod replenishment by determining when the user's current supply of pods falls below a threshold amount (e.g., less than a week's worth of pods). In some embodiments, the remote server component 150 determines the user's current pod supply (e.g., a remaining number of unused pods) by comparing the number of pod purchased by the consumer (e.g., purchased from the beverage forming apparatus manufacturer, such as via an e-commerce website) and the number of pods consumed by the user. The remote server component 150 also may determine whether the number of remaining pods has fallen below the threshold amount. The remote server component 150 may run an algorithm to make such a calculation.

As an additional aspect of using the data in step 180, a further sub-step involves, the sending user notifications in step 188 based upon the decoded or other harvested information (e.g., that there is a sale on a particular type of cartridge). In some embodiments the user notifications include an email sent to a user's email address (e.g., with a link to purchase the sale items). The user notifications also may include a message displayed on the user interface of the apparatus.

Figure 10B:
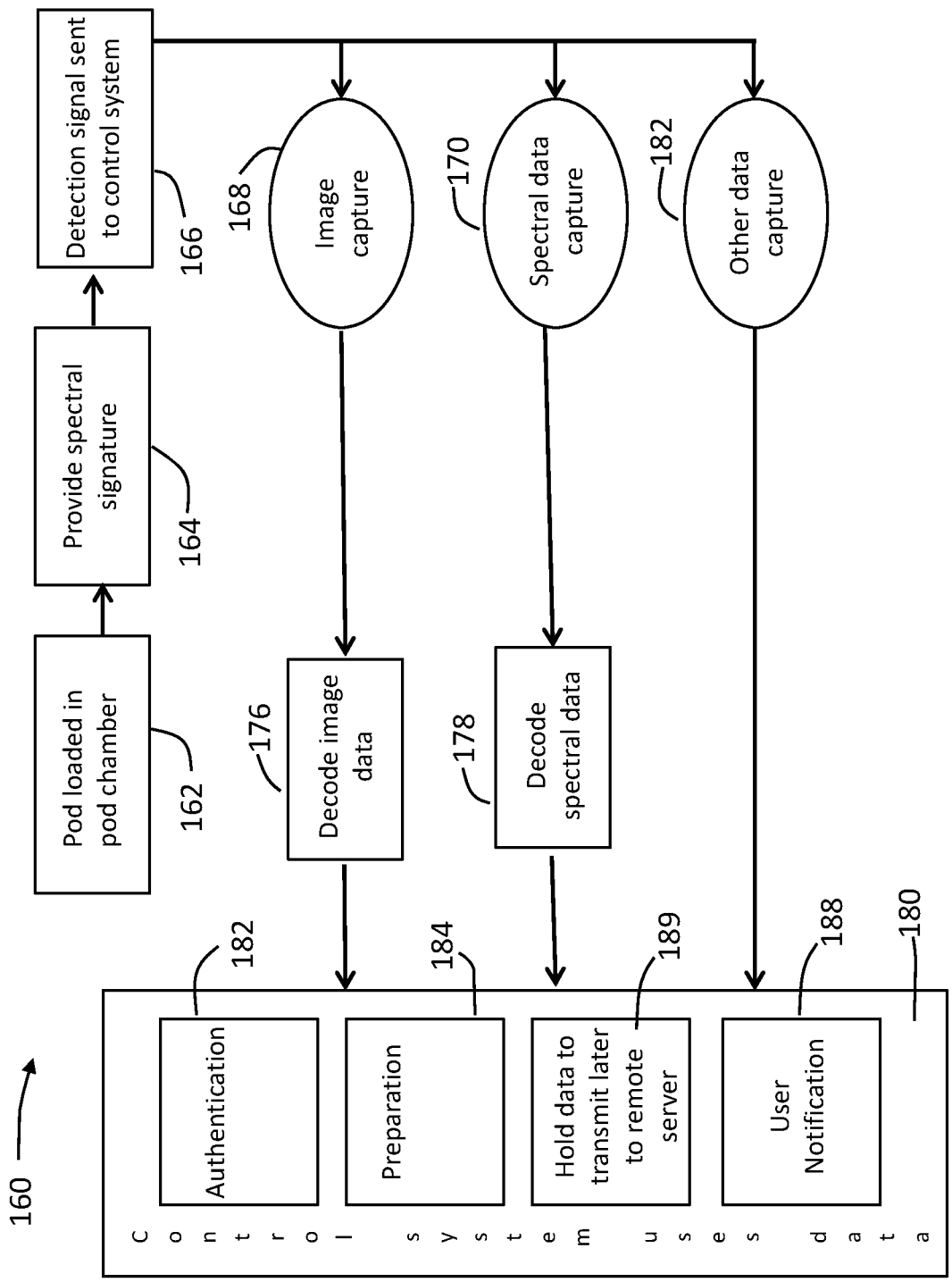
FIG. 10b schematically illustrates a modification of the method of FIG. 10a in which harvested data is used in one or more ways onboard the food and beverage system from which the data was harvested.

FIG. 10*b* shows an alternative embodiment of method 160. Method 160 of FIG. 10*b* is identical to method 160 of FIG. 10*a*, except that method 160 in FIG. 10*b* does not include steps 172, 174, and 175 in which harvested data is sent to a remote server. Instead, harvested data is decoded in steps 176 and 178 and then used in step 180 locally onboard machine 18 rather than remotely. Any one or more uses in steps 182, 184, 188, or 189 may be practiced singly or in combination. FIG. 10*b* also includes optional step 189 in which onboard aspects of control system 20 in machine 18 hold data for later transmission to remote server 150. Such delayed transmission may be desirable if a remote connection is not continuously present or if data transmission is scheduled to occur at periodic times or in response to triggering event(s).

A wide variety of brewing machines are known that prepare food and beverage items from corresponding pods. Examples of conventional brewing machines are described in U.S. Pat. Nos. 8,495,949; 9,622,613; 7,165,488; and 7,523,695; as well as U.S. Pub. Nos. 2017/0295988; 2016/0267369; and 2017/0215632. The brewing machines of U.S. Pub. Nos. 2017/0295988 and 2017/0215632 in particular incorporate "smart brewer" capabilities in that the brewers harvest and use pod data to help implement brewer functions. Other examples of known brewing machines include K-cup brewing machines commercially available under trade designations including Keurig. Any of the brewing machines described in such patent documents or that are commercially available can be modified to incorporate the teachings of the present invention. To modify such brewing machines to incorporate principles of the present invention, the machines are fitted with at least one LED illumination source that provides an ultraviolet illumination having an illumination peak in the range from 300 nm to 420 nm in a main peak having a bandwidth of 20 nm to 200 nm, preferably 50 nm to 150 nm. Additionally, the machine is fitted with a spectral detector optionally having an optical filter that blocks ultraviolet wavelengths, e.g., wavelengths under 400 nm, from reaching the detector. As a further potential modification, the brewers are incorporated into brewing systems that use spectral signature data, optionally in combination with matching bar code data, to authenticate pods 12 used in machine 18 as coming from one or more sources pre-associated with one or more particular spectral signatures.

Figure 11:
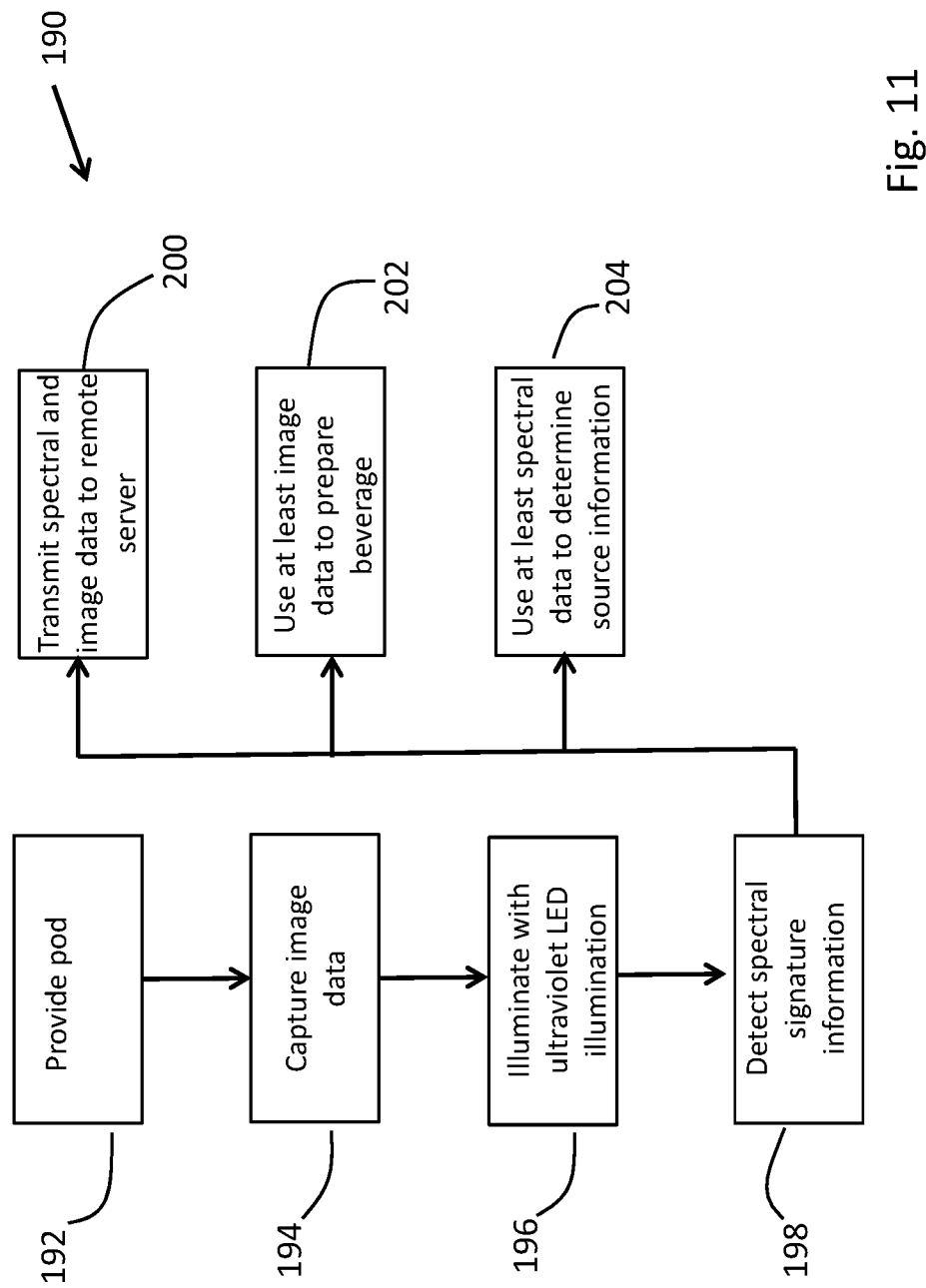
FIG. 11 schematically illustrates a block diagram of a method of the present invention useful for preparing a beverage with the system of FIG. 1.

FIG. 11 shows an alternative method 190 of the present invention in which system 10 is used to prepare a brewed beverage item 34 from at least first and second beverage precursors 14 and 16. In step 192, consumable substance storage pod 12 is provided. Pod 12 comprises the first beverage precursor 14 stored in the pod. Lid 80 of pod incorporates the following features:

i) At least one image 120 is provided on a surface of lid 80. The at least one image 120 includes encoded, machine readable image data that is indicative of a characteristic of the first consumable substance precursor 14 stored in the consumable substance storage pod12.

ii) A luminescent taggant system is provided on a surface of the lid 80 of the consumable substance storage pod 12. The luminescent taggant system includes at least first and second and third luminescent taggant compounds 106, 110, and 114, wherein the first and second luminescent taggant compounds 106 and 110 are incorporated into at least one ink layer 118 printed on the pod 12 and wherein the third luminescent taggant compound 116 is incorporated into a transparent topcoat layer 112 printed onto at least a portion of the at least one ink layer 118.

In step 194, control system 20 causes image data of the at least one image 120 to be captured with an imaging device 130.

In step 196, the control system 20 causes the luminescent taggant system to be illuminated with at least ultraviolet LED illumination that causes the first, second and third luminescent taggant compounds to emit luminescent spectral signals.

In step 198, the control system 20 causes spectral signature information indicative of the spectral signals of the first, second, and third luminescent taggant compounds to be detected One or more of steps 200, 202, and 204 may be practiced. These may be practiced in parallel or sequentially in any order. In step 200, control system 20 transmits the image data and the spectral signature information to at least one remote server.

In step 202, control system 20 uses information comprising the image data to prepare the beverage from ingredients comprising the first and second beverage precursors 14 and 16.

In step 204, control system 20 uses the spectral signature information to determine information indicative of a source of the beverage pod.

Figure 12:
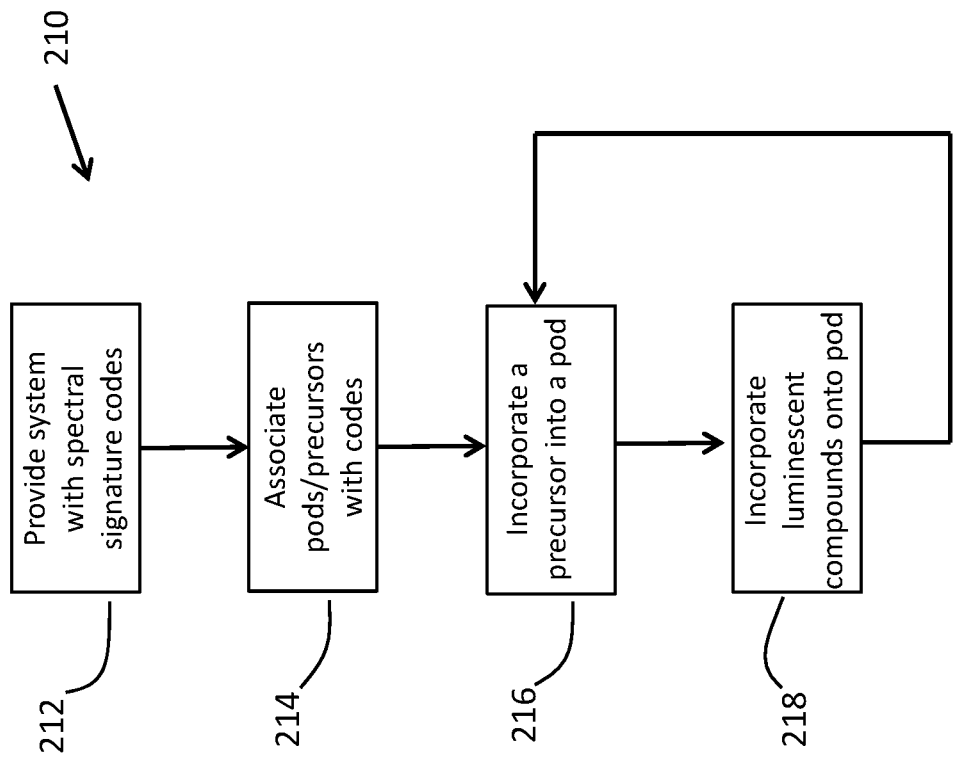
FIG. 12 schematically illustrates a block diagram of a method of making the system of FIG. 1.

FIG. 12 shows a method 210 useful to make system 10. In step 212, a spectral signature system is provided that comprises a plurality of unique spectral signature codes, wherein each spectral signature code is derived from the luminescent emissions of at least first, second, and third luminescent compounds, wherein the signature code for at least one of the luminescent taggant compounds comprises blue light signature features that are luminescently triggered by ultraviolet LED illumination.

In step 214, a plurality of beverage pod precursors are associated with the spectral signature codes.

In step 216, a desired serving size amount of a beverage precursor is incorporated into a storage pod.

In step 218, at least the first, second and third luminescent compounds of a first associated spectral signature code are incorporated onto the storage pod, wherein the first and second luminescent compounds are incorporated into one or more layers printed on the pod, and wherein the third luminescent compound is incorporated into a transparent layer provided on at least a portion of the one or more printed layers including the first and second luminescent compounds.

Steps 216 and 218 are repeated at least one additional time for a different beverage precursor and a second associated spectral signature code, wherein the first and second associated spectral signature codes are different.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A spectral signature system useful for authenticating a bar code image on a substrate, said spectral signature system comprising:
   a) a spectral signature pre-associated with the bar code image, wherein at least a portion of the spectral signature is encoded in spectral characteristics of at least one optical brightener compound and/or in spectral characteristics of at least one infrared absorbing compound, and wherein at least a portion of the spectral signature is encoded in spectral characteristics of at least one additional luminescent taggant compound;
   b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature; and
   c) a taggant system that encodes the spectral signature, wherein the taggant system includes:
      i) at least one of the optical brightener compound and/or the infrared absorbing compound; and
      ii) the at least one additional luminescent taggant compound.

2. The spectral signature system of claim 1, wherein the taggant system comprises both the optical brightener compound and the infrared absorbing compound.

3. The spectral signature system of claim 1, wherein the at least one additional luminescent compound is an organic, fluorescent dye.

4. The spectral signature system of claim 1, wherein the taggant system comprises a first and second luminescent compound in addition to the at least one of the optical brightener compound and the infrared absorbing compound.

5. The spectral signature system of claim 1, further comprising a control system comprising program instructions that evaluate information comprising spectral data emitted by the substrate to determine information indicative of whether the substrate comprises said taggant system encoding the spectral signature.

6. The spectral signature system of claim 5, wherein the control system comprises a remote server component, wherein the remote server component comprises the program instructions that evaluate information comprising spectral data emitted by the substrate to determine information indicative of whether the substrate comprises said taggant system encoding the spectral signature.

7. The spectral signature system of claim 6, wherein said program instructions decode the spectral data.

8. The spectral signature system of claim 5, wherein the control system further comprising additional program instructions that use the decoded bar code and/or the decoded spectral signature to select a recipe to prepare a beverage.

9. The spectral signature system of claim 5, wherein the control system causes undecoded image data and undecoded spectral data to be transmitted to a remote server component.

10. The spectral signature system of claim 1, wherein the substrate comprises a pod comprising a base container and a lid, wherein at least a portion of the taggant system is incorporated into a ring on the lid.

11. The spectral signature system of claim 10, wherein the lid further comprises an optically transparent top coat, wherein the taggant system comprises an optical brightener compound, and wherein the topical brightener compound is incorporated into the top coat.

12. The spectral signature system of claim 10, wherein the ring comprises different printed layers.

13. The spectral signature system of claim 12, wherein at least a portion of the taggant system is incorporated into different printed layers of the ring.

14. The spectral signature system of claim 1, wherein the illumination system includes both the first illumination and the second illumination.

15. The spectral signature system of claim 14, wherein the taggant system comprises both the optical brightener compound and the infrared absorbing compound.

16. The spectral signature system of claim 1, wherein the system comprises the first illumination, wherein the system further comprises an illumination detector that captures spectral emissions and a filter provided in a manner to block light having a wavelength under 400 nm from reaching the detector.

17. A spectral signature system useful for authenticating a substrate, said spectral signature system comprising:
 a) a spectral signature pre-associated with the substrate, wherein at least a portion of the spectral signature is encoded in spectral characteristics of at least one optical brightener compound and/or in spectral characteristics of at least one infrared absorbing compound, and wherein at least a portion of the spectral signature is encoded in spectral characteristics of at least one additional luminescent taggant compound;
 b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature;
 c) a taggant system that encodes the spectral signature, wherein the taggant system includes:
  i) at least one of the optical brightener compound and/or the infrared absorbing compound; and
  ii) the at least one additional luminescent taggant compound; and
 d) optionally a control system comprising program instructions that evaluate information comprising spectral data emitted by the substrate to determine information indicative of whether the substrate comprises said taggant system encoding the spectral signature.

18. A spectral signature system useful to authenticate a bar code on a food package, said spectral signature system comprising:
 a) a spectral signature pre-associated with the bar code image, wherein at least a portion of the spectral signature is encoded in spectral characteristics of at least one optical brightener compound and/or in spectral characteristics of at least one infrared absorbing compound, and wherein at least a portion of the spectral signature is encoded in spectral characteristics of at least one additional luminescent taggant compound;
 b) an illumination system comprising at least one of a first illumination that provides at least an ultraviolet and/or violet illumination in one or more portions of a wavelength range from 200 nm to 420 nm and/or a second illumination that provides at least infrared illumination in one or more portions of a wavelength range from 700 nm to 1200 nm, wherein the illumination system includes the first illumination at least when the optical brightener encodes at least a portion of the spectral signature, and wherein the illumination system includes the second illumination at least when the infrared absorbing compound encodes at least a portion of the spectral signature;
 c) a taggant system that encodes the spectral signature, wherein the taggant system includes:
  i) at least one of the optical brightener compound and/or the infrared absorbing compound; and
  ii) the at least one additional luminescent taggant compound; and
 d) optionally a control system comprising program instructions that evaluate information comprising spectral data emitted by the food package to determine information indicative of whether the food package comprises said taggant system encoding the spectral signature.

19. A method of making a beverage pod system, comprising the steps of:
 a) providing a spectral signature system comprising a plurality of unique spectral signature codes comprising first and second spectral codes, wherein the first and second spectral codes are different, wherein at least a portion of at least one of the first and second spectral signature codes is encoded in optical characteristics of a taggant system comprising at least one optical brightener compound and/or in optical characteristics of at least one infrared absorbing compound;
 b) associating a first beverage pod with the first spectral signature code;
 c) incorporating the first spectral signature code onto a surface of the first beverage pod;
 d) associating a second beverage pod with the second spectral signature code; and
 e) incorporating the second spectral signature code onto a surface of the second beverage pod.

* * * * *